US006290311B1

(12) United States Patent
Watanabe et al.

(10) Patent No.: US 6,290,311 B1
(45) Date of Patent: *Sep. 18, 2001

(54) BRAKE SYSTEM OF VEHICLE FOR SIMULTANEOUS EXECUTION OF DRIVER'S BRAKING AND AUTOMATIC BEHAVIOR CONTROL

(75) Inventors: Ryochi Watanabe, Susono; Shirou Monzaki, Mishima; Hiroaki Endo, Suntou-gun, all of (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,901

(22) Filed: Aug. 7, 1998

(30) Foreign Application Priority Data

Aug. 22, 1997 (JP) .................................................. 9-242214
Jul. 3, 1998 (JP) ................................................. 10-189086

(51) Int. Cl.[7] ...................................................... B60T 8/60
(52) U.S. Cl. ........................... 303/146; 303/140; 303/189
(58) Field of Search ................................... 303/140, 146, 303/189, 9.62, 144, 176, 113.4, 113.5

(56) References Cited

U.S. PATENT DOCUMENTS

| 5,326,160 | * | 7/1994 | Bayliss et al. ..................... 303/113.2 |
| 5,704,695 | * | 1/1998 | Monzaki et al. ..................... 303/146 |
| 5,704,696 | * | 1/1998 | Monzaki ............................... 303/146 |
| 5,707,120 | * | 1/1998 | Monzaki et al. ..................... 303/146 |
| 5,709,439 | * | 1/1998 | Monzaki ............................... 303/146 |
| 5,711,585 | * | 1/1998 | Tozu et al. ............................. 303/146 |
| 5,717,591 | | 2/1998 | Okada et al. . |
| 5,722,743 | | 3/1998 | Sano . |
| 5,727,853 | | 3/1998 | Monzaki . |
| 5,738,420 | * | 4/1998 | Kawaguchi et al. ................. 303/146 |
| 5,782,543 | * | 7/1998 | Monzaki et al. ..................... 303/146 |
| 5,797,663 | * | 8/1998 | Kawaguchi et al. ................. 303/146 |
| 5,839,798 | * | 11/1998 | Monzaki et al. ..................... 303/146 |
| 5,839,799 | * | 11/1998 | Fukada ................................. 303/146 |
| 5,882,092 | * | 3/1999 | Koibuchi ............................. 303/146 |
| 5,893,896 | | 4/1999 | Imamura et al. . |
| 5,984,433 | * | 11/1999 | Sumpe et al. ........................ 303/155 |

FOREIGN PATENT DOCUMENTS

| 44 37 701 A1 | 4/1996 | (DE) . |
| 196 26 406 A1 | 1/1997 | (DE) . |
| 196 42 054 A1 | 4/1997 | (DE) . |
| 197 22 716 A1 | 3/1998 | (DE) . |
| 9-226557 | 9/1997 | (JP) . |

* cited by examiner

*Primary Examiner*—Robert J. Oberleitner
*Assistant Examiner*—Devon Kramer
(74) *Attorney, Agent, or Firm*—Oliff & Berridge, PLC

(57) ABSTRACT

In a brake system of a four-wheel vehicle having a powered fluid pressure source, fluid flow control circuit including control valves, and an automatic controller for selectively operating the powered fluid pressure source and the control valves so as to supply a controlled fluid pressure based upon the powered fluid pressure source to a selected one or more of the wheel cylinders for an execution of a behavior control of the vehicle according to running conditions of the vehicle, the automatic controller also executes a brake control of supplying a controlled fluid pressure based upon the powered fluid pressure source to at least one of the wheel cylinders according to a depression of a brake pedal by a driver during the execution of the behavior control, the at least one wheel cylinder being one or more of the wheel cylinders not selected for the behavior control.

21 Claims, 18 Drawing Sheets

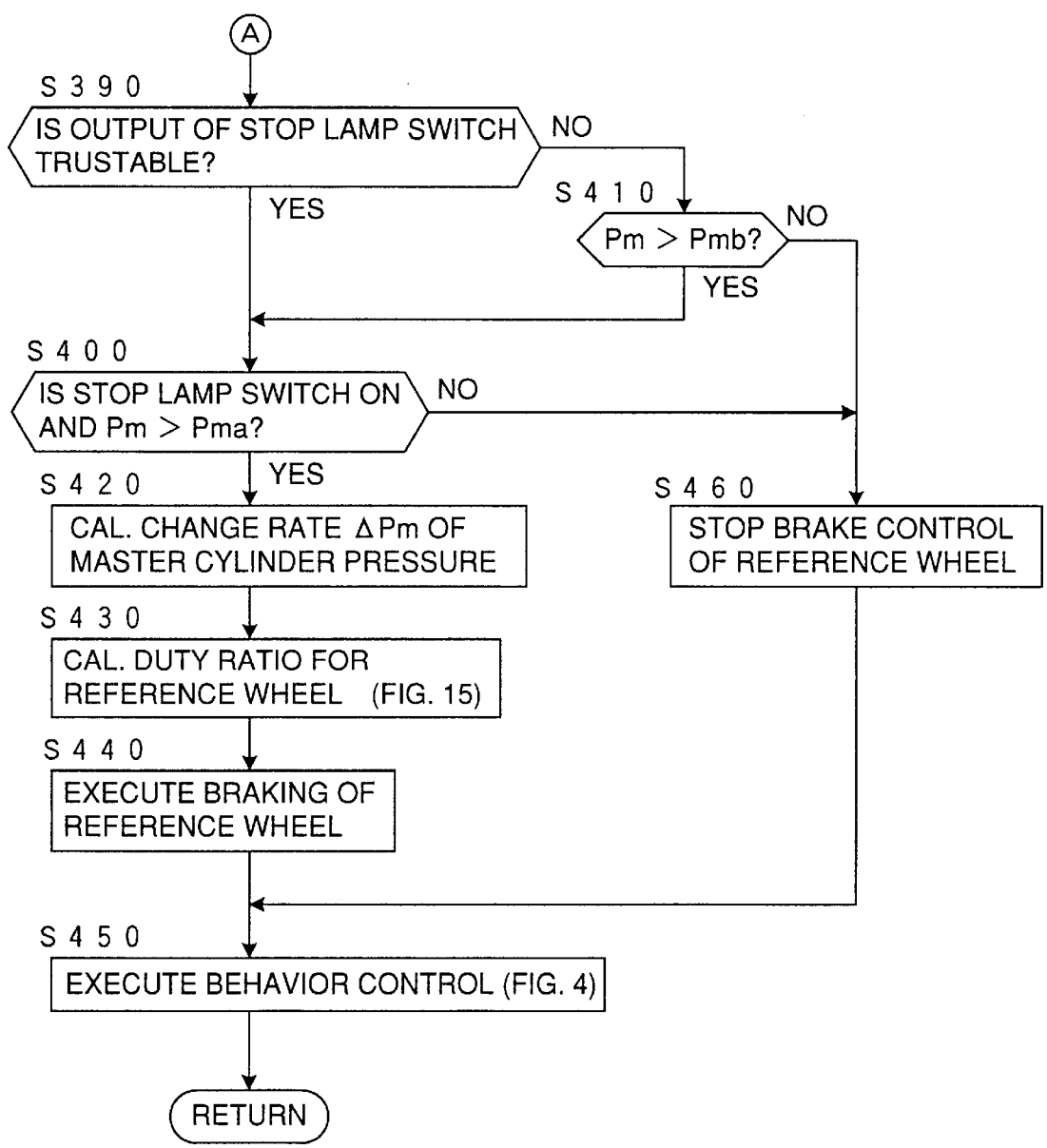

BRAKE SYSTEM OF VEHICLE FOR SIMULTANEOUS EXECUTION OF DRIVER'S BRAKING AND AUTOMATIC BEHAVIOR CONTROL

BACKGROUND OF THE INVENTION

1. Field of the Invention

The present invention relates to a brake system of a vehicle, and more particularly, to a brake system of a vehicle constructed to execute an automatic behavior control of the vehicle such as a spin control or a driftout control according to running conditions of the vehicle such as vehicle speed, lateral acceleration, yaw rate, steering angle, longitudinal acceleration and wheel speeds, and also to execute a calculated braking control of the vehicle according to a depression of a brake pedal by the driver.

2. Description of the Prior Art

There have been proposed various automatic behavior control systems for vehicles constructed to execute a spin control or a driftout control by automatically braking a selected one or more of the front left, front right, rear left and rear right wheels according to behavior control calculations based upon running parameters of the vehicle such as vehicle speed, lateral acceleration, yaw rate, steering angle, longitudinal acceleration, and wheel speeds, as shown in, for example, U.S. Pat. No. 5,717,591/DE-OS 19533575, U.S. Ser. No. 08/680,044/DE-OS 19632068, U.S. Pat. No. 5,727,853/DE-OS 19644293, and U.S. Ser. No. 08/798,465/DE-OS 19707059.

According to those prior art brake systems, during a normal running of the vehicle where there is no need of spin or driftout control, the wheel cylinders of the vehicle are generally connected with the master cylinder adapted to be actuated by a driver through a depression of the brake pedal, while when it is judged by an automatic controller, indeed a microcomputer, incorporated in the brake system that there is a need of a spin control or a driftout control, a pertinent one or more of the wheel cylinders are disconnected from the master cylinder so as to be be selectively supplied with a fluid pressure of a powered fluid pressure source such as a motor-driven pump via a control valve or valves operated by the automatic controller according to a behavior control calculation conducted therein based upon running parameters of the vehicle such as the vehicle speed, etc.

As well known in the art, a spin control by such an automatic brake system is generally executed so as to supply a controlled fluid pressure to the wheel cylinder of a front wheel serving at the outside of a turn running of the vehicle from the view point of most effectively generating an anti-spin moment in the vehicle by its inertia, while a driftout suppress control is executable in higher variety of manners, so as to supply a controlled fluid pressure to the wheel cylinder or either of both of the rear wheels principally from the view point of decelerating the vehicle, as the driftout is generally caused by an overdue of the centrifugal force against the tire grip force available at the front wheels, or to supply a controlled fluid pressure to the wheel cylinder of a rear wheel or rear as well as front wheels serving at the inside of a turn, so as to generate an anti-driftout moment in the vehicle.

In either case, if the brake system is so constructed that, when one of the left and right side wheel cylinders is disconnected from the master cylinder for a behavior control, the other wheel cylinder is maintained in communication with the master cylinder, the driver's will for optionally braking the vehicle is executed through the other side wheel cylinder. Indeed, when, for example, the front right wheel is braked for the purpose of suppressing a spin of a vehicle making a left turn, a spin control is executed according to a spin control calculation which calculates a due slip ratio to be effected at the front right wheel based upon a reference wheel speed which is generally selected to be the wheel speed of the front left wheel. Therefore, when the driver depresses the brake pedal during an execution of an automatic spin control, or when an automatic spin control is executed while the driver is depressing the brake pedal, the driver's will for a deceleration of the vehicle is executed at least by the front left wheel, while the automatic spin control is executed in reflection of the deceleration of the vehicle according to the driver's will through a reduction of the reference wheel speed. Since the wheel speed of the front wheel serving at the inside of a turn is generally used as the reference wheel speed also for the driftout control, the same effect of reflection of the driver's braking is also available in the driftout control.

SUMMARY OF THE INVENTION

However, it, is contemplated that the driver's braking and the automatic behavior control will be more effectively coordinated by more ingeniously operating the brake system equipped with the automatic controller having a high versatility of calculations, even when the brake system has separate control valves for the left and right sides fluid circuit so that either the left side fluid circuit or the right side fluid circuit is independently changed over between the connections with the master cylinder and the powered fluid pressure source, allowing the vehicle to remain under the control of a driver through either side fluid circuit, while the other side is placed under the control of the automatic controller.

Further, it is more positively contemplated that if the driver's will for braking the vehicle expressed by a depression of the brake pedal is executed through a conversion into a pertinent calculation by the automatic controller, a more totally harmonized brake-and-behavior control of a vehicle will be accomplished, while allowing to dispense with at least one of the left and right side control valves which are mechanical devices unavoidably much more expensive than electronics elements or even mere software.

Therefore, it is a primary object of the present invention to provide a brake system of a vehicle for an execution of an automatic behavior control, wherein the braking action by a driver's is more effectively coordinated with the automatic behavior control.

A further object of the present invention is to provide a brake system to accomplish the above-mentioned primary object with a conversion of expensive mechanical parts into less expensive electronics parts or software.

According to the present invention, the above-mentioned primary and further objects are accomplished by a brake system of a vehicle having front left, front right, rear left and rear right wheels, the brake system comprising wheel cylinders each corresponding to each of the above-mentioned wheels, a brake pedal adapted to be depressed by a driver, a master cylinder operatively connected with the brake pedal to be compressed according to a depression thereof by the driver, powered fluid pressure source means, fluid flow control circuit means including control valves, and an automatic controller for selectively operating the powered fluid pressure source means and the control valves so as to supply a controlled fluid pressure based upon the powered fluid pressure source means to a selected one or more of the wheel cylinders for an execution of a behavior control of the vehicle according to running conditions of the vehicle, wherein the automatic controller also executes a brake control of supplying a controlled fluid pressure based upon the powered fluid pressure source means to at least one of the wheel cylinders according to a depression of the brake pedal by the driver during the execution of the behavior control, the at least one wheel cylinder being one or more of the wheel cylinders not selected for the behavior control.

In the brake system of the above-mentioned construction, the automatic controller may supply the controlled fluid pressure for the execution of the behavior control to the wheel cylinder of one of the rear wheels serving at the inside of a turn of the vehicle when the behavior control is to suppress a driftout of the vehicle, while it is also supplies the controlled fluid pressure according to the depression of the brake pedal by the driver to one of the rear wheel serving at the outside of the turn.

Alternatively, in the brake system of the above-mentioned construction, the automatic controller may supply the controlled fluid pressure for the execution of the behavior control to the wheel cylinder of one of the front wheels serving at the outside of a turn of the vehicle when the behavior control is to suppress a spin of the vehicle, while it also supplies the controlled fluid pressure according to the depression of the brake pedal by the driver to one of the front wheels serving at the inside of the turn.

Further, the automatic controller may generally switch one of the control valves from a first switch position to a second switch position while the brake pedal is being depressed beyond a predetermined depths so as to be prepared for supplying the controlled fluid pressure based upon the powered fluid pressure source means to the at least one wheel cylinder according to the depression of the brake pedal by the driver such that at the second switch position the at least one wheel cylinder is isolated from the master cylinder, the automatic controller further controlling the one control valves so as to be held at the second switch position for at least a predetermined time duration regardless of a release of the depression of the brake pedal when it executed a second time of switching the one control valve from the first switch position to the second switch position subsequent to a first time of switching the one control valve from the first switch position to the second switch position before a predetermined time lapses after the end thereof.

Further, the automatic controller may further execute an ABS control of decreasing the fluid pressure supplied to the at least one wheel cylinder according to the depression of the brake pedal by the driver when the supply of the fluid pressure thereto causes an excessive slipping of one of the wheels corresponding thereto.

In this case, the automatic controller may generally switch one of the control valves from a first switch position to a second switch position while the brake pedal is being depressed beyond a predetermined depth so as to be prepared for supplying the controlled fluid pressure based upon the powered fluid pressure source means to the at least one wheel cylinder according to the depression of the brake pedal by the driver such that at the second switch position the at least one wheel cylinder is isolated from the master cylinder, the automatic controller further controlling the one control valve so as to be held at the second switch position for at least a predetermined time duration regardless of a release of the depression of the brake pedal when it executed a second time of the ABS control subsequent to a first time of the ABS control before a predetermined time time duration lapses after the end thereof.

Further, the brake system may further comprise a pressure sensor for detecting a fluid pressure of the master cylinder, while the automatic controller confirms if an output of the pressure sensor is trustable before executing the brake control according to the depression of the brake pedal by the driver.

In this case, the brake system may further comprise a stop lamp switch for detecting a depression of the brake pedal by the driver beyond a predetermined depth, while the automatic controller confirms if an output of the stop lamp switch is trustable before executing the brake control according to the depression of the brake pedal by the driver.

The brake system may further confirm that the stop lamp switch is indicating the depression of the brake pedal larger than the predetermined depth, with a simultaneous indication by the pressure sensor of the master cylinder pressure higher than a first predetermined value, before executing the brake control according to the depression of the brake pedal by the driver.

The automatic controller may further confirm that the pressure sensor indicates a pressure of the master cylinder higher than a second predetermined value when the stop lamp switch is not indicating the depression of the brake pedal larger than the predetermined depth, before executing the brake control according to the depression of the brake pedal by the the driver.

The brake system may further confirm, when a first condition that the stop lamp switch is detecting the brake pedal being depressed beyond the predetermined depth and a second condition that the pressure sensor is detecting a fluid pressure of the master cylinder larger than the predetermined value are not at the same time, that the stop lamp switch does not detect the brake pedal being depressed beyond the predetermined depth, while the pressure sensor does not detect the master cylinder pressure higher than a third predetermined value, before executing the brake control according to the depression of the brake pedal by the driver.

Further, the brake system may further comprise a pressure sensor for detecting a fluid pressure of the master cylinder, while the automatic controller confirms if an output of the pressure sensor is trustable, and if the output of the sensor is not trustable, the automatic controller excludes the wheel cylinders of the rear left and rear right wheel so that they are in communication with the master cylinder when it judges that a spin control is required, while it excludes the wheel cylinders of the front left and front right wheels so that they are in communication with the master cylinder when it judges that a driftout control is required.

In this case, when the automatic controller judges that a spin control is required, while it also judges a need of an ABS control for one of the front wheels serving at the inside of a turn of the vehicle, the automatic controller may execute a braking of the one front wheel a supply of a fluid pressure controlled according to a predetermined schedule of pulses.

Further, the automatic controller may supply a fluid to the at least one wheel cylinder as a series of pulse flows thereof at a duty ratio which increases from zero according to increase of the change rate of a fluid pressure of the master cylinder beyond a predetermined first substantial threshold value when the fluid pressure of the master cylinder increases, while it exhausts the fluid from the at least one wheel cylinder as a series of pulse flows thereof at a duty ratio which increases from zero according to increase of the change rate of the fluid pressure of the master cylinder beyond a predetermined second substantial threshold value when the fluid pressure of the master cylinder decreases.

Further, the automatic controller may supply a fluid to the at least one wheel cylinder as a series of pulse flows thereof at a duty ratio which increases from a substantial initial value according to increase of the change rate of a fluid pressure of the master cylinder beyond zero when the fluid pressure of the master cylinder increases, while it exhausts the fluid from the at least one wheel cylinder as a series of pulse flows thereof at a duty ratio which increases from zero according to increase of the change rate of the fluid pressure of the master cylinder beyond a predetermined second substantial threshold value when the fluid pressure of the master cylinder decreases.

In this case, the initial value may be increased according to increase of the fluid pressure of the master cylinder.

In this case, the duty ratio may increase at a higher rate according to increase of the change rate of the fluid pressure of the master cylinder as the fluid pressure of the master cylinder increases.

Further, the duty ratio may increase at a higher rate according to increase of the change rate of the fluid pressure of the master cylinder as the fluid pressure of the master cylinder increases.

Further, the automatic controller may supply a fluid to the at least one wheel cylinder as a series of pulse flows thereof at a duty ratio which increases from a substantial initial value according to increase of the change rate of a fluid pressure of the master cylinder beyond zero when the fluid pressure of the master cylinder increases, while it supplies the fluid to the at least one wheel cylinder as a series of pulse flows thereof at a duty ratio which is substantially constant when the fluid pressure of the master cylinder decreases.

The above-mentioned brake system may further comprise a stop lamp switch for detecting a depression of the brake pedal by the driver beyond a predetermined depth before executing the brake control according to the depression of the brake pedal by the driver, while the automatic controller confirms, when the stop lamp switch is not detecting the brake pedal being depressed beyond the predetermined depth, that it is judging a need of an ABS control with respect to one of the front wheels serving at the inside of a turn before executing the brake control according to the depression of the brake pedal by the driver.

In the above-mentioned brake system, when the wheel cylinder of one of the front left and front right wheels supplied when the fluid pressure for the behavior control is being exhausted of the fluid pressure for a restoration thereof, while the brake pedal is not substantially depressed, the automatic controller may control at least one of the control valves such that the exhausting pressure is not substantially supplied to the wheel cylinder of the other of the front left and front wheels.

BRIEF DESCRIPTION OF THE DRAWINGS

In the accompanying drawings,

FIGS. 14A, 14B and 14C are flowcharts to be combined at terminals A and B to show a third embodiment of the present invention in the form of the operation thereof;

DESCRIPTION OF THE EMBODIMENTS

Figure 1A:
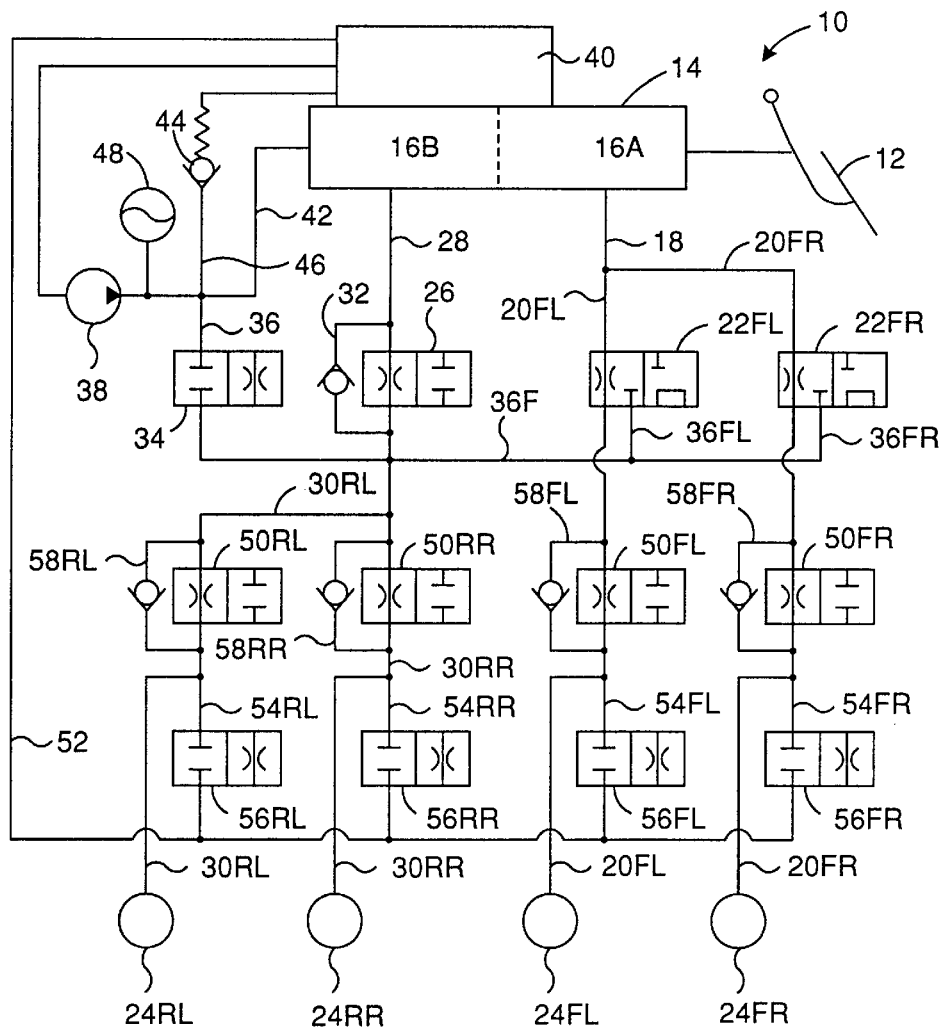
FIG. 1A is a diagrammatical illustration of a first example of a brake hydraulic circuit of a vehicle with which several embodiments of the present invention are constructed.

In the following, the present invention will be describe in more detail in the form of several embodiments with reference to the accompanying drawings.

Referring to FIG. 1, showing a first example of a brake hydraulic circuit of a vehicle totally designated by 10 with which several embodiments of the present invention are constructed, 12 is a brake pedal adapted to be depressed by a driver, and 14 is a master cylinder adapted to be compressed by a depression of the brake pedal by a driver. The master cylinder has a front cylinder chamber 16A for front wheels and a rear cylinder chambers 16B for rear wheels.

A fluid conducting passage 18 for front left and front right wheels is connected with the front chamber 14 of the master 14 of the master cylinder, the passage 18 being branched to a passage 20FL leading to a wheel cylinder 24FL of a front left wheel not shown in the figure and a passage 20FR leading to a wheel cylinder 24FR of a front right wheel not shown in the figure.

In the passage 20FL, a control valve 22FL is incorporated so as normally to let the passage open through, while blocking a terminal of a passage 36FL, in its "off" condition shown in the figure, not energized by a control line not shown in the figure, whereas when it is energized to its "on" condition, the passage 20FL is blocked off from the master cylinder, while the passage 36FL is connected with a downstream side of the passage 20FL, so that the wheel cylinder 24FL is disconnected from the master cylinder to be connected with a pump 38 through the passage 36FL and passages 36F and 36 incorporating a control valve 34 therein. A control valve 50FL is incorporated in the downstream part of the passage 20FL, so as to selectively throttle a supply of the fluid pressure to the wheel chamber 24FL by being selectively energized by a control line not shown, wherein the control valve 50FL lets the passage 20FL open through when it is in its "off" condition not energized, while it blocks the passage 20FL in its "on" condition energized.

Opposite toward the control valve 50FL, the wheel cylinder 24FL is connected with a return passage 52 leading to a fluid reservoir 40 provided adjacent the master cylinder through a passage 54FL incorporating a control valve 56FL which blocks the passage 54FL in its "off" condition not energized, while it lets the passage 54FL open through when it is switched over to its "on" condition by being energized. A bypass 58FL is provided to go around the control valve 50FL with a non return valve which allows the fluid to flow only from the downstream side to the upstream side of the control valve 50FL.

A similar construction is provided for the wheel cylinder 24FR, such as to include control valves 22FR for changing over the connection of the downstream side of the passage 20FR alternatively with the master cylinder or the pump 38 via a passage 36FR, a control valve 50FR for selectively letting the downstream part of the passage 20FR open through or blocked according to whether not energized or energized, a control valve 56FR for selectively blocking a passage 54FL or letting it open through to connect the wheel cylinder 24FR with the return passage 52 according to whether not energized or energized. A bypass passage 58FR is also provided to go around the control valve 50FR with a non return valve oriented to allow the fluid to flow only form downstream side to the upstream side thereof.

The rear cylinder chamber 16 of the master cylinder is connected with a passage 28 incorporating a control valve 26 common for wheel cylinder 24RL and 24RR of rear left and rear right wheels, respectively, not shown in the figure. In more details, passages 30RL and 30RR for supplying the fluid pressure for the wheel cylinders 24RL and 24RR are branched at the downstream side of the control valve 26, each incorporating control valve 50RL and 56RL or 50RR and 56RLR, respectively, each former being open when not energized to let each passage open through, while each blocks the passage when energized, whereas each latter being closed when not energized to block each passage, while each lets the passage open through when energized. The control valves 50RL and 50RR are also bypassed by bypass passages 58RL and 58RR, respectively, each incorporating a non return valve which allows the fluid to flow only from the downstream side to the upstream side of the control valve 50RL or 50RR. The wheel cylinders 24RL and 24RR are connected with the return passage 52 via passages 54RL and 54RR incorporating the control valves 56RL and 56RR, respectively.

The pump 38 supplies the pressurized fluid to the passage 36 incorporating the control valve 34 which blocks the passage 36 when not energized and lets it open through when energized, so as to supply the pressurized fluid to the passages 36FL and 36FR through the passage 36F for the front wheels, and also to the passages 30RL and 30RR for the rear wheels. An accumulator 48 is connected to the outlet passage of the pump 38. Further, the pump outlet pressure is supplied to the master cylinder for the purpose of boosting the master cylinder pressure, particularly the pressure of the rear cylinder chamber 16. 46 is a relief passage including a relief valve 44 for relieving the supply of the fluid pressure by the pump 38 when its pressure is excessively high.

Figure 1B:
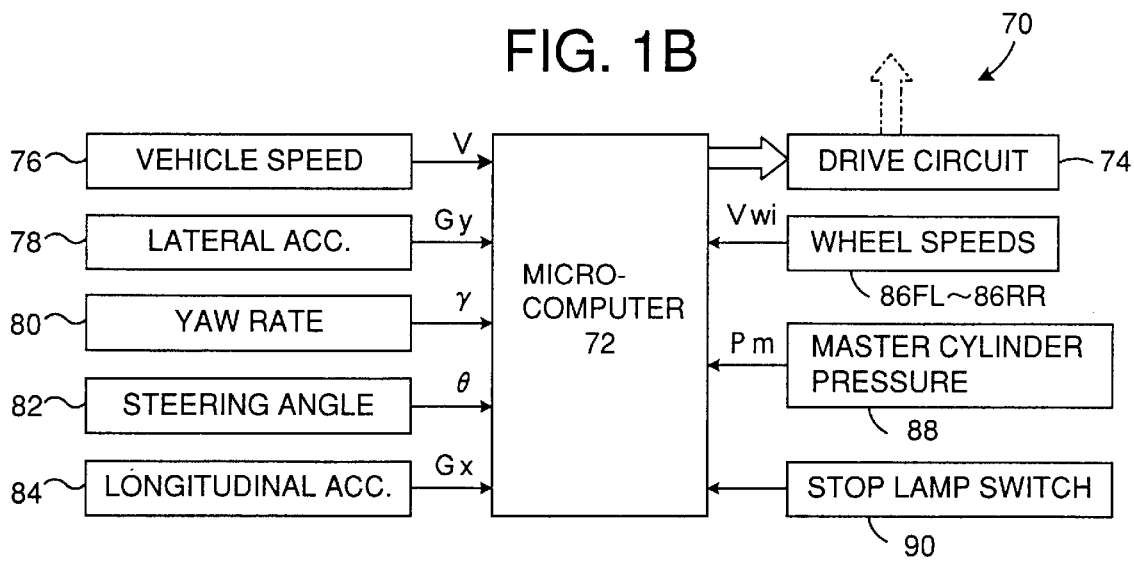
FIG. 1B is a diagram showing an automatic controller forming an essential part of the brake system of the present invention, together with means for supplying inputs of parameters required for the operation of the brake system.

The hydraulic circuit of FIG. 1A is operated by a control part of the brake system generally shown by 70 in FIG. 1B, in which 72 is a microcomputer constructing an essential part of an automatic controller for operating the hydraulic circuit shown in FIG. 1A via a drive circuit 74. The microcomputer 72 is supplied with various parameters necessary for executing its control operation, such as vehicle speed V from a vehicle speed sensor 76, lateral acceleration Gy from a lateral acceleration sensor 78, yaw rate γ from a yaw rate sensor 80, steering angle O from a steering angle sensor 82, longitudinal acceleration Gx from a longitudinal acceleration sensor 84, wheel speed Vwi (i=fl, fr, rl, rr) of the front left, front right, rear left and rear right wheels from wheel speed sensors 86FL-86RR, master cylinder pressure Pm from a master cylinder pressure sensor 88, and a signal indicating whether the brake pedal 12 is depressed beyond a predetermined depth or not from a stop lamp switch 90.

Although not shown in detail, the microcomputer 72 may be of a usual construction comprising a central processing unit, a random access memory, a read only memory, input and output means and a unilateral bus interconnecting these elements, and is adapted to execute various control operations as described in detail hereinbelow based upon the parameters like the vehicle speed V, etc. according to various control programs stored in the read only memory, so as to operate the control valves shown in FIG. 1A via the drive circuit 74.

A first embodiment of the brake system according to the present invention will be described in the form of the control operation thereof by referring to FIG. 2 and others.

When the brake system of the first embodiment is started by a closure of an ignition switch of a vehicle in which the brake system is incorporated, in step 10 signals are read in from the vehicle speed sensor 76 and others shown in FIG. 1B. Then, in step 20, a behavior control calculation is carried out as shown by a flowchart of FIG. 3.

Figure 3:
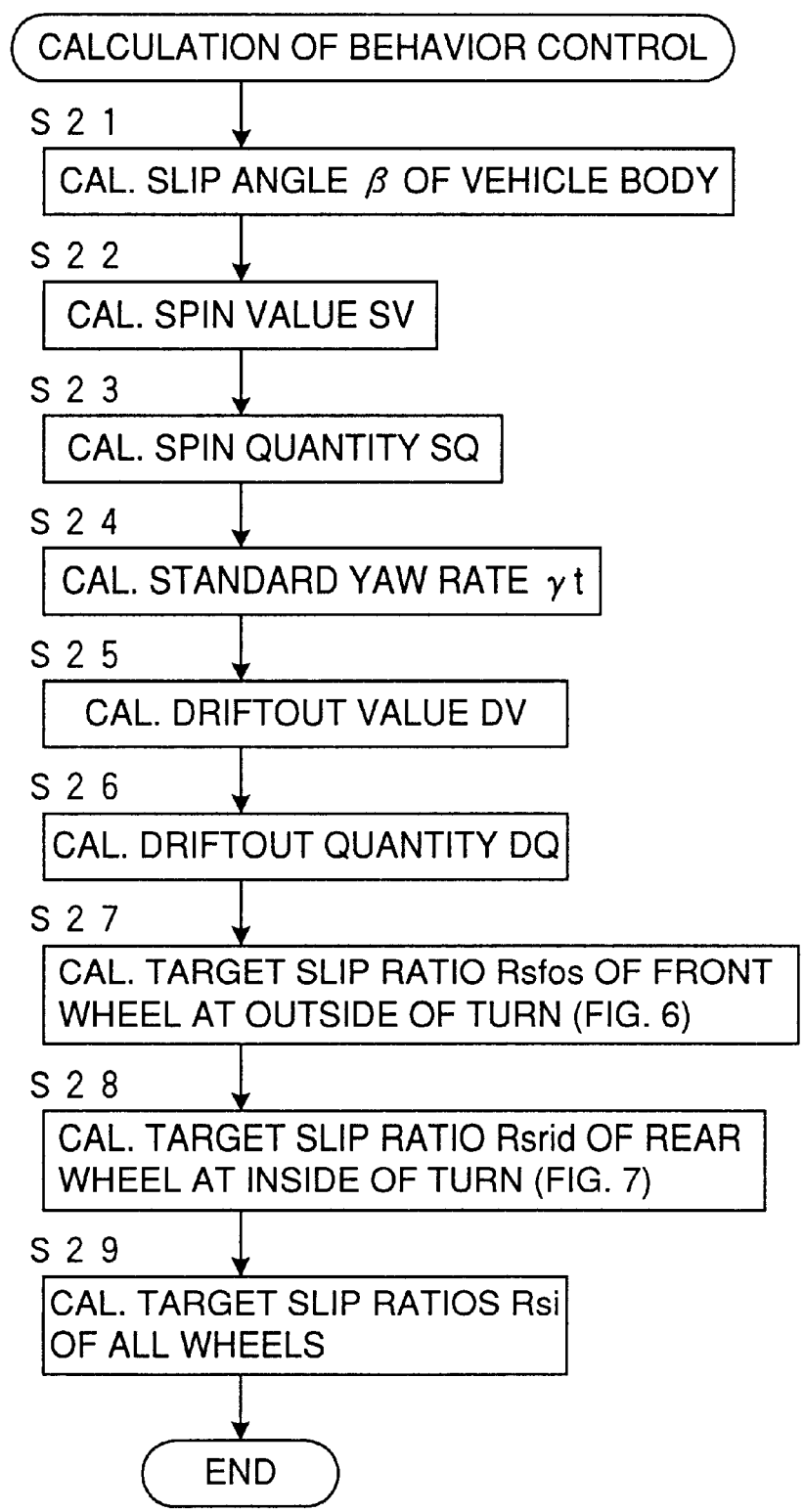
FIG. 3 is a flowchart showing an embodiment of the behavior control calculation executed in step 20 of the flowchart of FIG. 3 and also in the subsequent embodiments.

Referring temporarily to FIG. 3 showing an embodiment of the calculation of behavior control, in step 21, the slip angel β of the vehicle body is calculated as ratio of side slide velocity Vy to longitudinal velocity Vx of the vehicle body, wherein the side slide velocity Vy is calculated by first obtaining a difference between a product of lateral acceleration Gy and a product of vehicle speed V and yaw rate γ, such as Vyd=Gy−V* γ, and then integrating Vyd on time basis to obtain the side slide velocity Vy, while on the other hand, approximating the longitudinal velocity Vx of the vehicle body to be the same as vehicle speed V detected by the vehicle speed sensor 76, such as β=Vy/Vx.

In step 22, a parameter called spin value SV, representing a liability to spin, is calculated as K1* β+K2*Vyd by taking appropriate proportioning factors K1 nd K2. Alternating, the spin value may be estimated as a linear sum of the slip angle β and its differential value βd.

In step 23, a spin quantity SQ is determined such that SQ=SV when the vehicle is making a left turn, while SQ=−SV when the vehicle is making a right turn. If the value SV is negative when the vehicle is making a left turn, SQ is made zero. Similarly, if the value of SV is positive when the vehicle is making a right turn, SQ is made zero.

In step 24, a standard yaw rate γt is calculated by first calculating a theoretical yaw rate γc based upon vehicle speed V, steering angle O, wheel base H, steering gear ratio Rg and an appropriate constant factor Kh, and then modifying it for a transient performance by a time constant T and the Laplace operator s, as follows:

$$\gamma c = V * 0/(1+Kh*V^2)*H/Rg$$

$$\gamma t = \gamma c/(1+T*s)$$

In step 25, a parameter called drift value DV, representing a liability to driftout, is calculated such as DV=γt−γ or DV=H*(γt−γ)/V.

In step 26, a driftout quantity DQ is determined such that DQ is determined such that DQ=DV when the vehicle is making a left turn, while DQ=−DV when the vehicle is making a right turn. If the value of DV is negative when the vehicle is making a left turn, DQ is made zero. Similarly, if the value of DV is positive when the vehicle is making a right turn, DQ is made zero.

Figure 6:
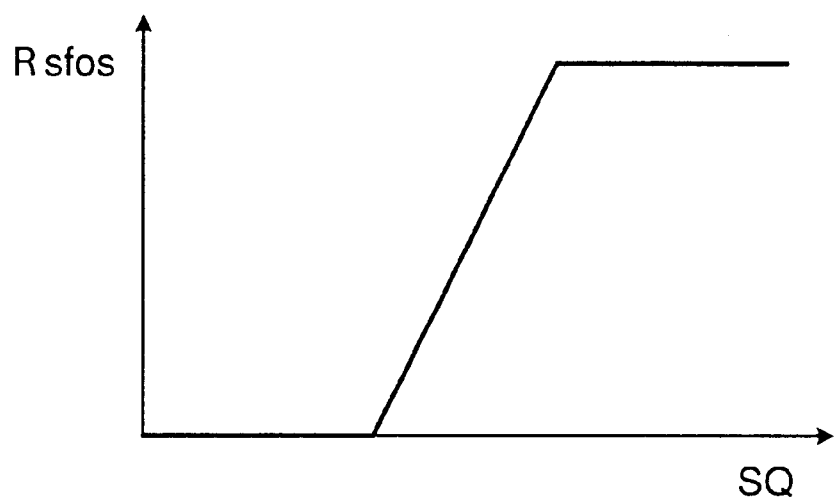
FIG. 6 is a graph showing an example of a map for calculating a slip ratio to be targeted at a front wheel serving the outside of a turn for a spin control according to a parameter called spin quantity.
Figure 7:
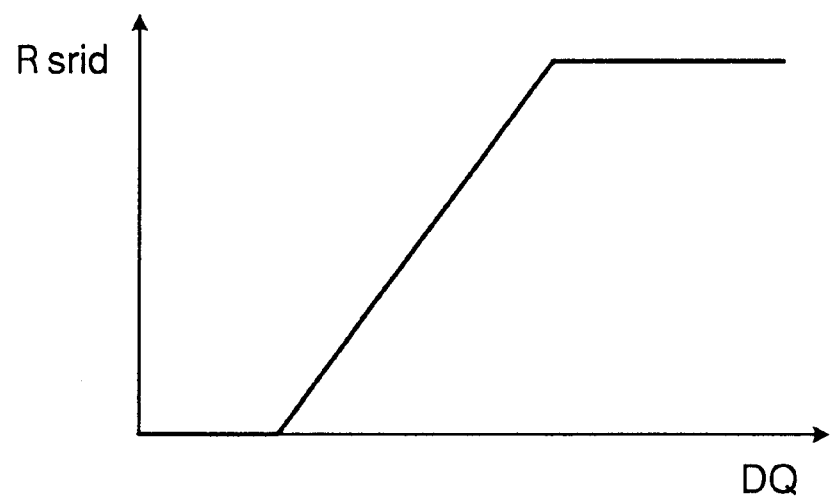
FIG. 7 is a graph showing an example of a map for calculating a slip ratio to be targeted at a rear wheel serving at the inside of a turn according to a parameter called driftout quantity.

In step 27, by referring to the map of FIG. 6, a target slip ratio Rsfos for a front wheel serving at the outside of the turn is obtained. Similarly, in step 28, by referring to the map of FIG. 7, a target slip ratio Rsrid for a rear wheel serving at the inside of the turn is obtained.

In the step 29, target slip ratios Rsi (i=fo, fi, ro, rr) for the four wheels are determined according to the below-mentioned general formats, wherein fo, fi, ro and rr indicate "front wheel serving at the outside of the turn", "front wheel serving at the inside of the turn", "rear wheel serving at the outside of the turn" and "rear wheel serving at the inside of the turn", respectively:

Rsfo=Rsfos
Rssi=0
Rsro=0
Rsri=Rsrid

As will be noted from the above, when Rsfos shows a substantial value according to a substantial value of SQ, the target slip ratio of the front wheel serving at the outside of the turn is increased so that the front wheel at the outside of the turn is braked so as to generate an anti-spin moment in the vehicle. On the other hands, when Rsrid shows a substantial value according to a substantial amount of DQ, the target slip ratio of the rear wheel serving at the inside of the turn is increased so as to brake the rear wheel at the inside of the turn, so as thereby to deccelerate the vehicle, while generating an anti-druiftout moment in the vehicle, both contributing to suppress the driftout of the vehicle, without increasing the slip ratio of the front wheels at which the tire grip has substanially surturated in a drifting out condition.

Although the above-mentioned general formulae of Rsi include both of Rsfos and Rsrid, since a spin and a driftout do not generally occur at the same time, when Rsfos shows a substantial value, Rsrid will be substantially zero, while when Rsrid shows a substantial value, Rsfos will be substantially zero.

Figure 2:
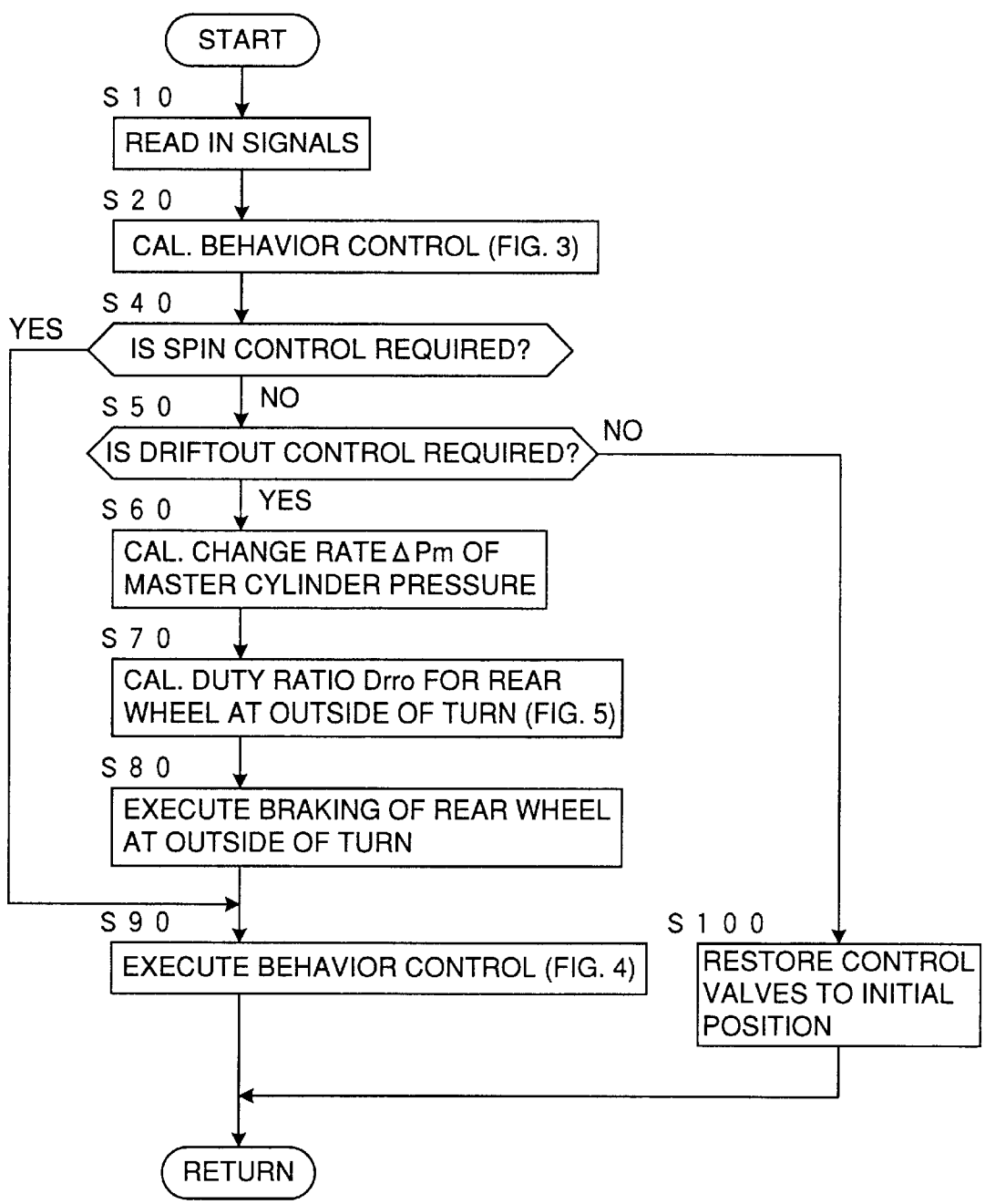
FIG. 2 is a flowchart showing a first embodiment of the present invention in the form of the operation thereof.

Returning to the flowchart of FIG. 2, in step 40, it is judged if a spin control is required according to the value of the spin quantity SQ. If the answer is yes, the control bypasses step 50–80 and directly comes to step 90.

When the answer of step 40 is no, in step 50 it is judged if a driftout control is required. If the answer is yes, the control proceeds to step 60, and a change rate ΔPm of the master cylinder pressure Pm is calculated. Then in step 70, referring to the map of FIG. 5, a duty ratio Drro for braking a rear wheel serving at the outside of the turn is calculated according to the value of ΔPm.

In step 80, a braking of the rear wheel serving at the outside of the turn is executed so as to supply a fluid pressure to the wheel cylinder 24RL or 24RR of the rear wheel serving at the outside of the turn, by operating the pump, closing the control valve 26, opening the control valve 34, and controlling the ratio of a first pulsating period during which the control valve 50RR or 50RL is opened while the control valve 56RR or 56RL is closed to a second pulsating period during which the control valve 50RR or 50RL is closed while the control valve 56RR or 56RL is opened to be the value of Drro, according to whether the vehicle is making a left turn or a right turn, respectively, whereby the rear wheel serving at the outside of the turn is braked to reflect the rate of change of the master cylinder pressure on the braking action applied to the rear wheel serving at the outside of the turn.

Figure 4:
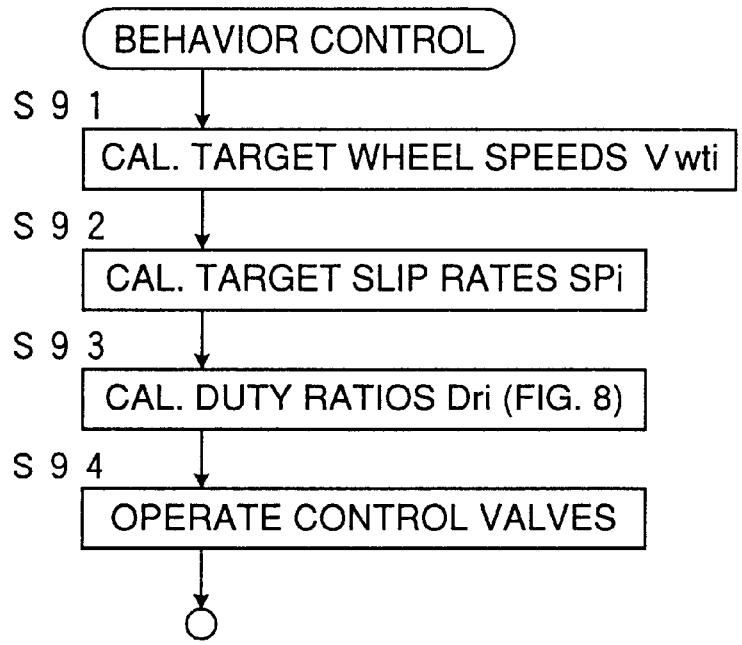
FIG. 4 is a flowchart showing an example of the behavior control executed in step 90 of the flowchart of FIG. 2 and also in the subsequent embodiments.

Then in step 90, according to whether it is a spin control or a driftout control that is required, a spin control or a driftout control is executed according to the processes shown by a flowchart of FIG. 4. When the answer of step 50 is no, i.e., when neither spin control nor driftout control is required, the process proceeds to step 100, where the control valves are restored to the respective initial positions as shown in FIG. 1A, and the control returns to step 10.

Referring to FIG. 4, the execution of the behavior control will be described.

In step 91, by taking a reference wheel generally to be a front wheel serving at the inside of the turn, target wheel speeds Vwti (I=fl, fr, rl, rr) for the four wheels are calculated as follows, wherein Vb is the wheel speed of the reference wheel:

$$Vwti=Vb*(100-Rsi)/100$$

In step 92, slip rate SPi of the four wheels are calculated as follows, wherein Vwid are the differential values of the respective vehicle speeds and Ks is an appropriate proportioning factor:

$$SPi=Vwi-Vwti+Ks*(Vwid-Gx)$$

Figure 8:
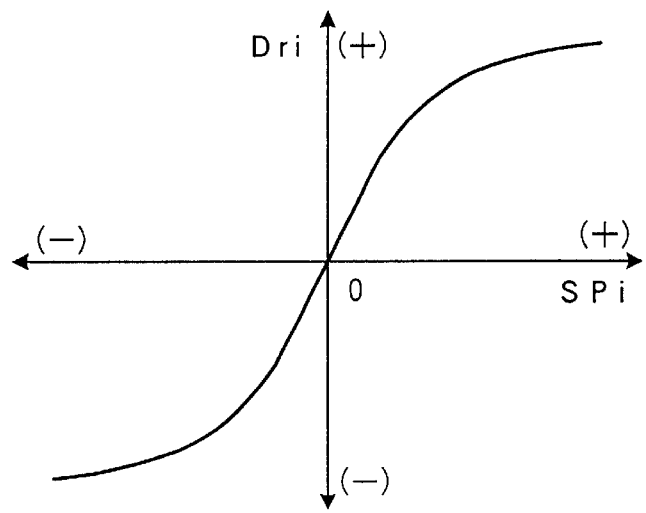
FIG. 8 is a graph showing an example of a map for calculating a duty ratio for switching a set of inlet and outlet valves for a wheel cylinder between a first condition of supplying a pressure fluid into the wheel cylinder and a second condition of exhausting the fluid pressure from the wheel cylinder and a second condition of exhausting the fluid pressure from the wheel cylinder according to a slip rate of a wheel.

In step 93, duty ratios Dri for braking the respective wheels are obtained based upon the calculated SPi by referring to the map of FIG. 8. When the vehicle is controlled against a spin, the value of Dri will be of a substantial value only with respect to the front wheel serving at the outside of the turn, while when the vehicle is controlled against a driftout, the duty ratio Dri will be of a substantial value only for the rear wheel serving at the inside of the turn in the present embodiment.

In step 94, when a spin control is to be executed, the control valve 22FR or 22FL for the front wheel serving at the outside of the turn is energized, with the pump 38 being started beforehand or at the same time together with energizing of the control valve 34, so as to supply the powered fluid pressure toward the wheel cylinder 24FR or 24FL, and a controlled fluid pressure is supplied to the wheel cylinder 24FR or 24FL by controlling the ratio of a first pulsating period during which the control valve 50FR or 50FL is opened while the control valve 56FR or 56FL is closed to a second pulsating period during which the control valve 50FR or 50FL is closed while the control valve 56FR or 56FL is opened to be the value of Drfo according to whether the vehicle is making a left turn or a right turn, respectively, so that the front wheel serving at the outside of the turn is braked for the spin control. Similarly, when a driftout control is to be executed, the rear wheel serving at the inside of the turn is braked in the same manner as described above according to, however, the duty ratio calculated for a driftout control.

Thus, according to the first embodiment of the present invention described above, when the driver depresses the brake pedal while the brake system is executing a driftout control, the rear wheel serving at the inside of the turn is braked according to the spin control, while the rear wheel serving at the outside of the turn is braked according to the change rate of the master cylinder due to the depression of the brake pedal by the driver.

In this connection, it will be noted that, in the hydraulic circuit of FIG. 1A in which the separate control valves 22FL and 22FR are provided for the front left and front right wheels, the wheels, the wheel cylinder of the front wheel serving at the inside of the turn is kept in communication with the master cylinder during a spin control, and therefore when the driver depresses the brake pedal during a spin control, the front wheel serving at the inside of the turn is directly braked by the pressure of the master cylinder, so as to decrease its rotation speed, i.e. the rotation speed of the reference wheel, so that the spin control automatically reflects thereupon the depression of the brake pedal by the driver through the spin suppress calculation which incorporates the rotation speed of the reference wheel.

Figure 9:
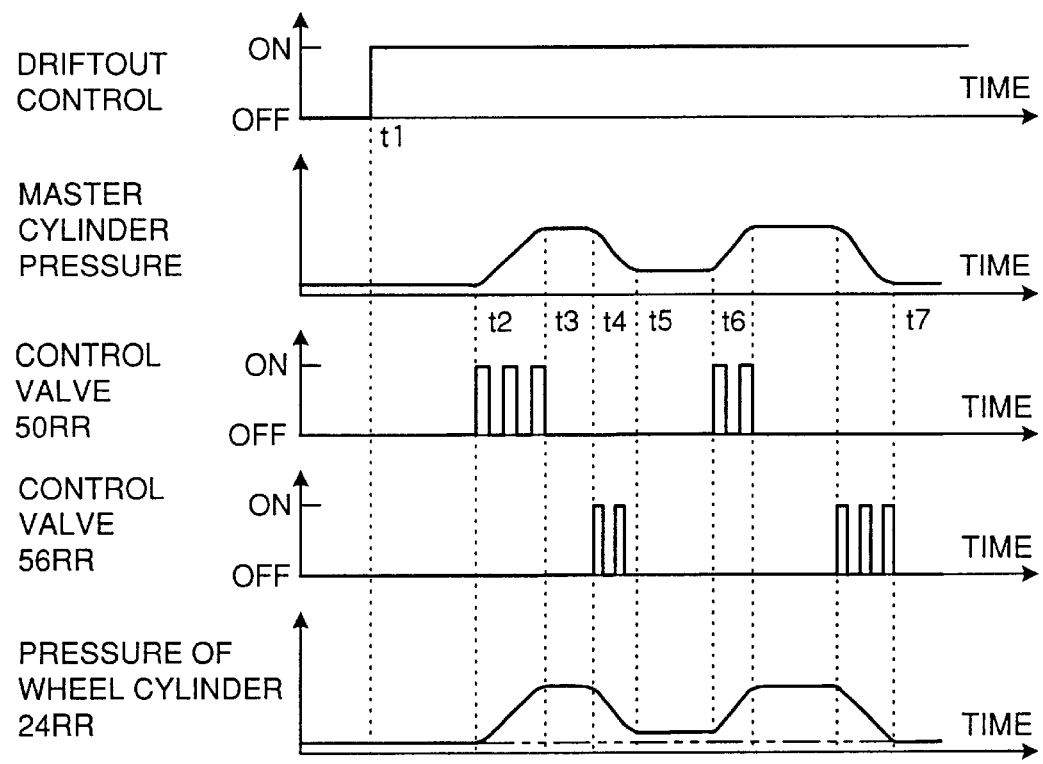
FIG. 9 is a multi-phased time chart showing an example of the correlated operations of the braking and the behavior control.

FIG. 9 shows an example of the correlated operation of the braking by the driver and the automatic behavior control. It is assumed that the vehicle is making a left turn, and at time point t1 a driftout control was started. When the driver starts to depress the brake pedal at time point t2 so that the master cylinder pressure gradually increases up to time point t3, the control valve 50RR is opened in a pulsating manner as shown in the time chart, although the frequency of the pulsation is much lower than in an actual device for the convenience of illustration. As the control valve 50RR is opened, the pressure of the wheel cylinder 24RR increases correspondingly as shown in the time chart. When the depression of the brake pedal is maintained from time point t3 to t4, the control valve 50RR is no longer opened. When the driver reduces the depression of the brake pedal at time point t4 as shown in the time chart toward time point t5, the control valve 56RR is opened in the same pulsating manner, so that the pressure of the wheel cylinder 24RR is correspondingly lowered. In the shown example, the driver does not completely release the brake pedal as time point t5, but maintains the brake pedal as lightly depressed, and at time point t6 he or she again increases the depression, and through a similar braking action of depressing, holding and releasing, at time point t7 he or she completely releases the brake pedal.

Figure 10:
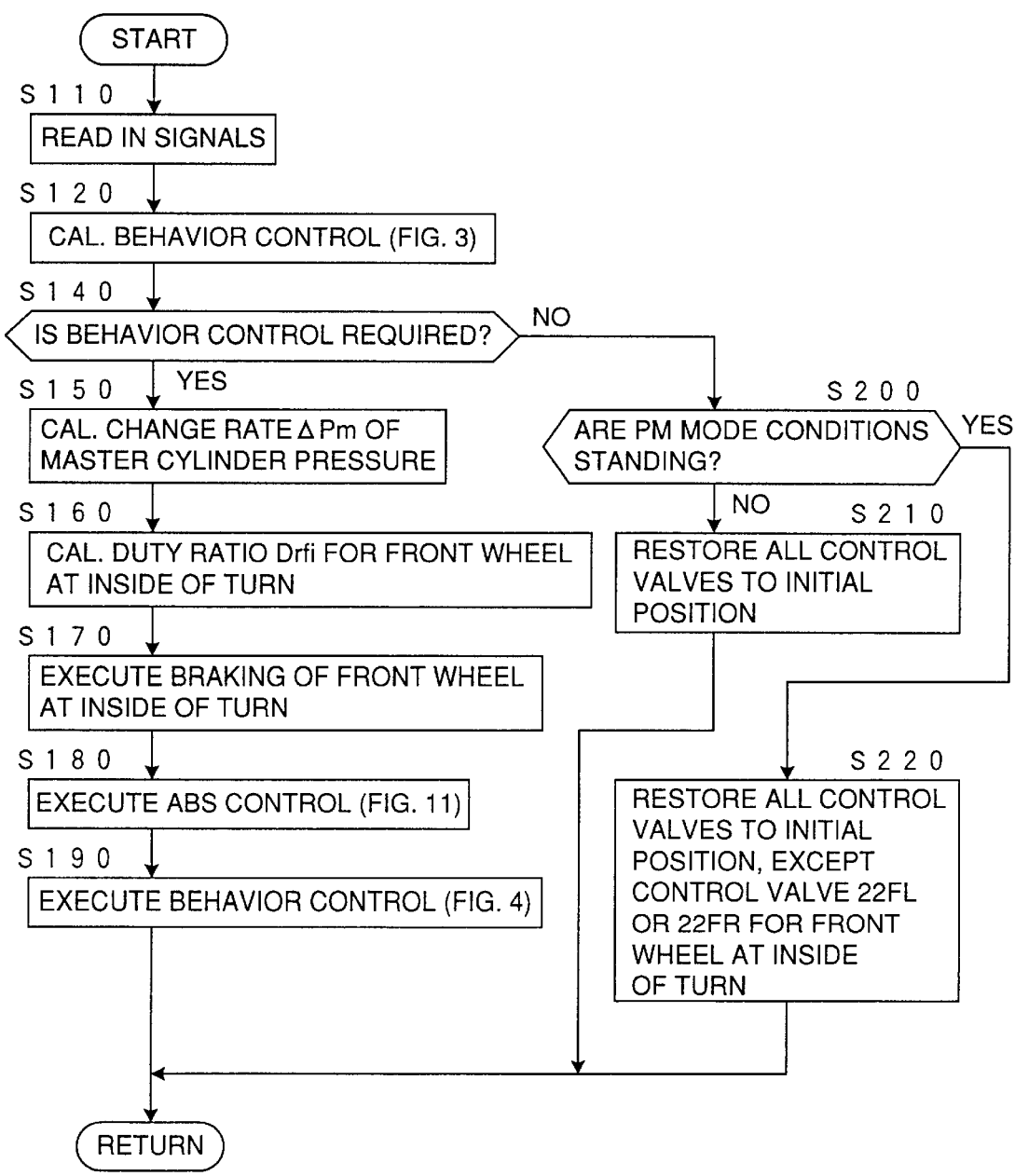
FIG. 10 is a flowchart showing a second embodiment of the present invention in the form of the operation thereof.

FIG. 10 shows a second embodiment of the brake system according to the present invention in the form of a flowchart illustrating its operation. The control of this second embodiment is also available by the hydraulic circuit shown in FIG. 1A and the automatic controller shown in FIG. 1B.

When the brake system is started for the control by a closure of an ignition switch not shown, in step 110 signals are read in from those sensors and switch shown in FIG. 1B.

In step 120, the calculation for the behavior is executed in the same manner as shown in FIG. 3.

In step 140, it is judged if any behavior control is required based upon the behavior control calculation of step 120. If the answer is yes, the control proceeds to step 150.

In step 150, change rate ΔPm of the master cylinder pressure is calculated.

Figure 5:
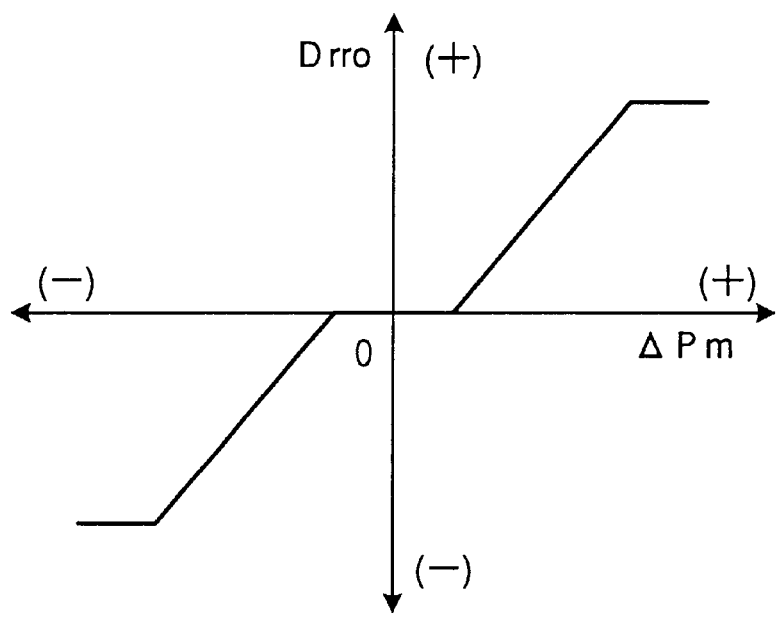
FIG. 5 is a graph showing an example of a map for calculating a duty ratio for supplying a fluid pressure to the wheel cylinder of a rear wheel serving at the outside of a turn according to a change rate of the master cylinder pressure.

In step 160, duty ratio Drfi for a front wheel serving at the inside of the turn is calculated according to the change rate ΔPm of the master cylinder pressure by referring to a map similar to that of FIG. 5 or one of those shown in FIGS. 15, 19, 22 and 23 as several modifications for applying a controlled braking to the front wheel serving at the inside of the turn, i.e. the wheel which is generally taken as the reference wheel in calculating the behavior control. Therefore, in the second embodiment, the braking by the driver's will be executed at the front wheel serving at the inside of the turn, i.e. the reference wheel of the behavior control, by energizing the control valve 22FL or 22FR for the front wheel serving at the inside of the turn, in addition to energizing the control valve 22FR or 22FL for a spin control or energizing the control valve 26 for a driftout control.

In step 170, the braking of the front wheel serving at the inside of the turn is executed based upon the duty ratio obtained in step 160 in the same manner as in step 80, by calculating the target wheel speeds Vwti of the respective wheels, in fact the target wheel speed of the front wheel serving at the inside of the turn as described with reference to the first embodiment, then calculating the slip rate SPi of the respective wheels as already described, and then operating the pertinent control valves in the same manner as described with respect to step 80, so that the front wheel serving at the inside of the turn is braked so as to reflect the driver's will of braking on the rotation speed of the reference wheel.

Figure 11:
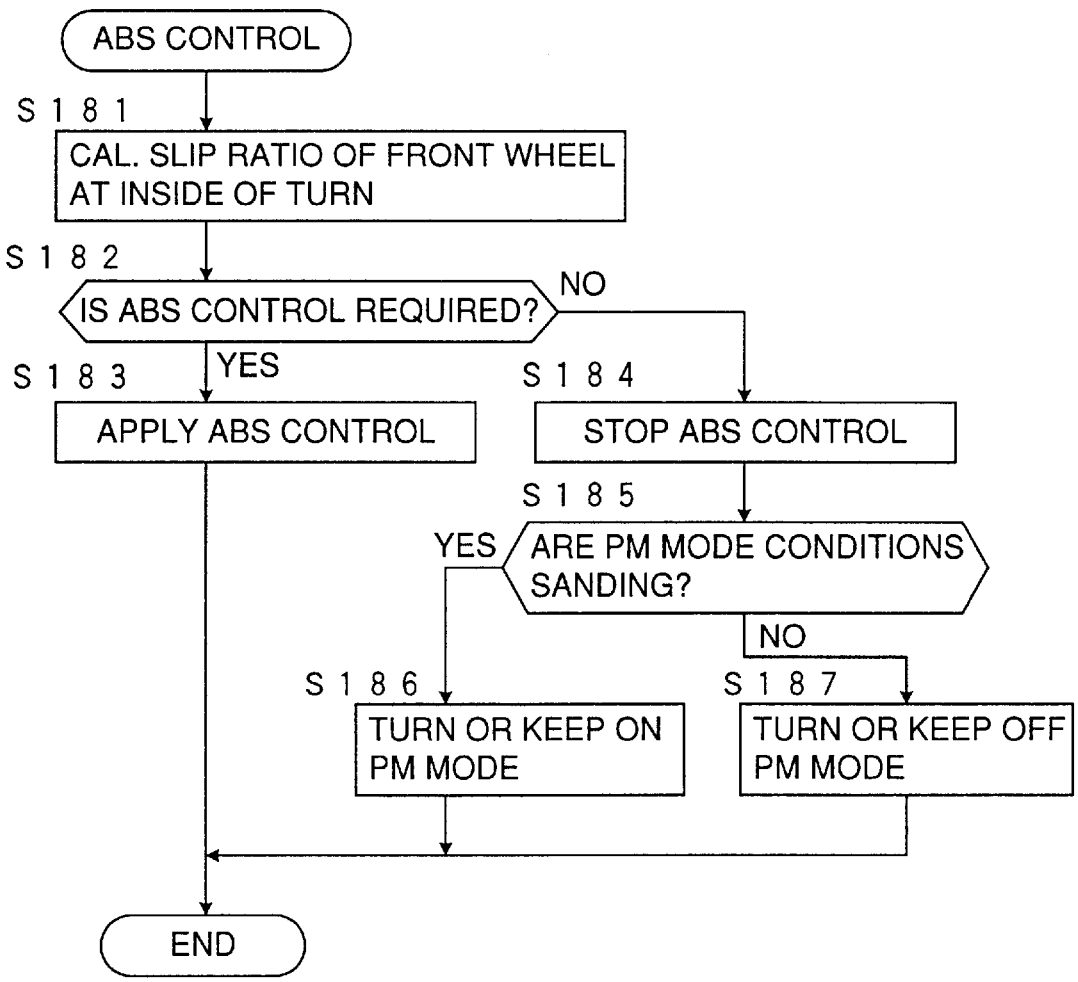
FIG. 11 is a flowchart showing an embodiment of an ABS control incorporating a PH mode control according to the present invention.

In step 180, an ABS control is executed according to the process shown in FIG. 11. Temporarily referring to FIG. 11, in step 181, the slip ratio of the front wheel serving at the inside of the turn is calculated. The calculation of the slip ratio of the front wheel serving at the inside of the turn which is generally the reference wheel for the behavior control, is calculated by estimating a non-slip vehicle speed of the front wheel serving at the inside of the turn based upon a mean value of the four wheels, or by selecting a medium wheel speed or a mean of two medium wheel speeds excluding the largest and the smallest wheel speed of the four wheels. Of course any other appropriate method may be used for estimating the most reasonable due wheel speed of the front wheel serving at the inside of the turn if it does not make any substantial slip.

In step 182, it is judged if an ABS control is required for the front wheel serving at the inside of the turn. If the answer is yes, the control proceeds to step 183, whereas if the answer is no, the control proceeds to step 184.

In step 183, the ABS control is applied to the front wheel serving at the inside of the turn, so as to decrease the braking action applied thereto.

In step 184, if the ABS control was being applied, the ABS control is stopped. When no ABS control is not yet applied, the control proceeds of course through steps 182, 184 and further.

In step 185, it is judged if Pm mode conditions are standing. As will be understood more clearly hereinbelow with reference to FIG. 12, the Pm mode is an operation mode by which the control valve 22FL or 22FR for the front wheel serving at the outside of the turn, which is energized in response to the depression of the brake pedal by the driver and remains in the energized condition as long as the brake pedal is being depressed beyond a predetermined small threshold value as detected by a stop lamp switch 90 shown in FIG. 1B, is maintained in the energized condition for a predetermined time duration even when the brake pedal has been released or the stop lamp switch 90 has been opened, so as to be prepared for the next operation of the brake control, thereby saving too frequent changing over of the control valve. As for the condition for triggering the Pm mode, the following conditions may be set up alone or in combination:

(1) A predetermined time does not lapse from the end of a depression of the brake pedal before a next depression thereof starts.

(2) A predetermined time does not lapse from the end of an ABS control before a next ABS control starts.

If the answer of step 185 is yes, the control proceeds to step 186, where the Pm mode is turned on or kept on it has already been started. If the answer of step 185 is no, the control proceeds to step 187, where the Pm mode is turned off or is kept off if it has not yet been started.

Returning to FIG. 10, in step 190, the behavior control, i.e. a spin control or a driftout control calculated in step 120 and determined in step 140, is executed according to the process shown in FIG. 4 in the same manner as in the first embodiment shown in FIG. 2.

When the answer of step 140 is no, the control proceeds to step 200, where it is checked if the Pm mode conditions are standing. If the answer is no, in step 210 all control valves are restored to the initial position shown in FIG. 1A, whereas if the answer of step 200 is yes, the control proceeds to step 220, where all control valves are restored to the initial position, except the control valve 22FL or 22FR for the front wheel serving at the inside of the turn of which the PH mode control is being executed.

Figure 12:
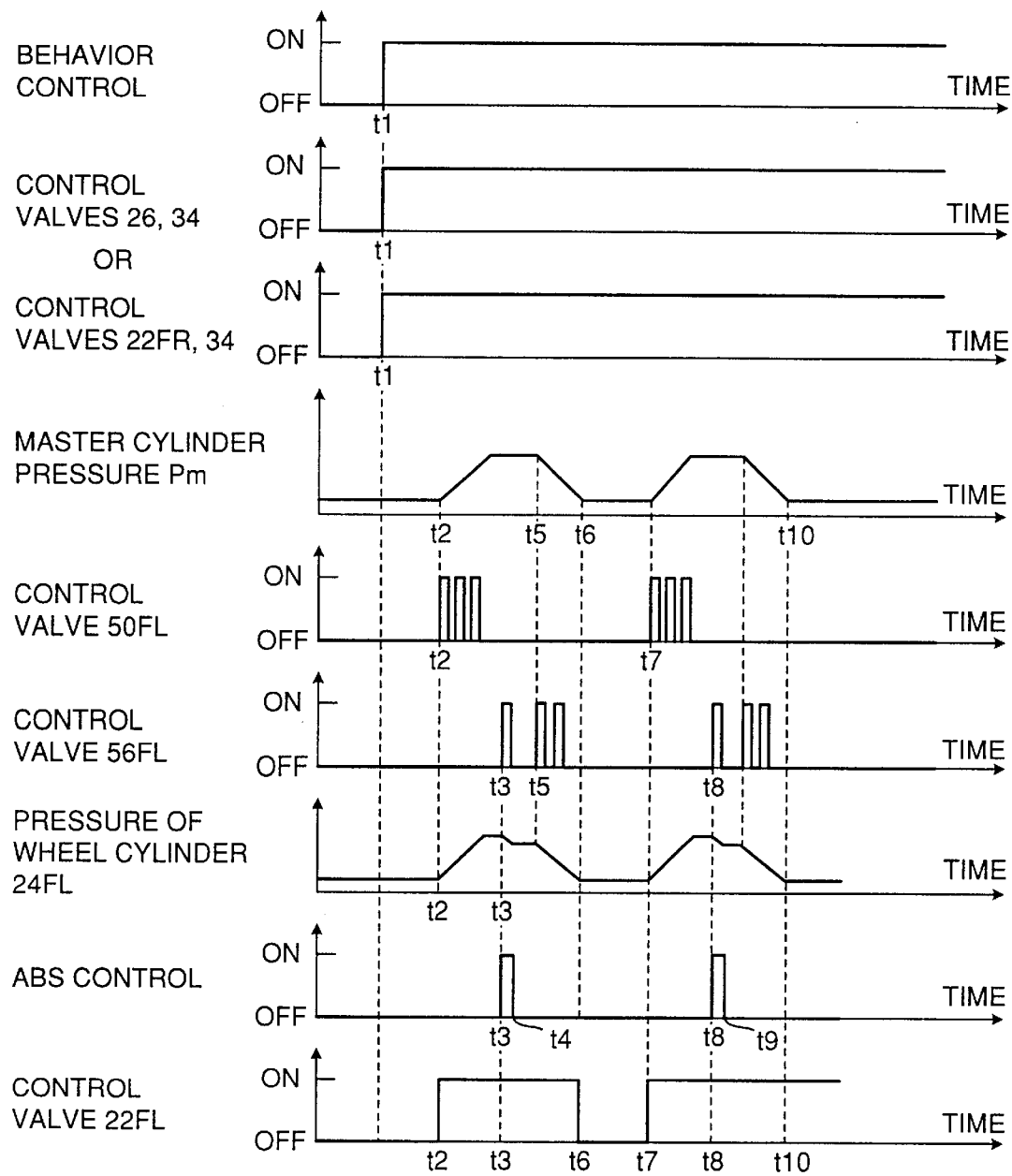
FIG. 12 is a multi-phased time chart showing an example of the correlated operations of the braking and the behavior control with the ABS control incorporating the PH mode control.

FIG. 12 is a multi-phased time chart showing an example of the correlated operations of the braking by the driver and the behavior control with the ABS control incorporating the Pm mode control. In FIG. 12, it is assumed that a behavior control is started at time point t1, whereby the control valves 26 and 34 are energized at the same time when one or two of the rear wheels are braked for an execution of a driftout control. or the control valves 22FR and 34 are energized at the same time for an execution of a spin control, when the vehicle is making a left turn.

During the execution of the behavior control, when the driver depresses the brake pedal at time point t2 so that the master cylinder pressure Pm increases as shown in the time chart, the control valve 50FL is energized in the same pulsating manner as described with reference to FIG. 9, whereby the pressure of the wheel cylinder 24FL increases as shown in the time chart, with the control valve 22FL also energized at time point t2. As noted with reference to FIG. 9, also in FIG. 12 the frequency of the pulsation is much lower than in an actual device for the convenience of illustration.

After the pressure of the wheel cylinder 24FL having been raised as shown in the flowchart according to the depression of the brake pedal, when the slip of the front left wheel becomes excessive so that the automatic controller judges a need of a ABS control at time point t3, the ABS control is started, whereby the control valve 56FL is energized in the same pulsating manner, although in the time chart only a single pulse is illustrated before the ABS control started at time point T3 ends at time point T4 as a result of a controlled decrease of the pressure of the wheel cylinder 24FL enough to accomplish the purpose of the ABS control. Thereafter, the driver starts to reduce the depression of the brake pedal at time point t5, so that the control valve 56FL is energized in the pulsating manner, until at time point t6 the brake pedal is completely released, with the pressure of the wheel cylinder 24 FL returning to its initial level at the same time. The control valve 22FL is deenergized at time point t6.

It is assumed that the driver repeated the same braking action as in the period t2–t6, starting at time point t7 so that a similar ABS control is again executed at time point t8 and is terminated at time point t9. The control valve 22FL is again energized at time point t7, and is to be deenergized at time point t10 when the brake pedal was completely released so that the master cylinder pressure Pm returns to its initial level. However, when the time duration between the end of the first brake control, i.e. t6, and the start of the next brake control, i.e. t7, is shorter than a predetermined threshold value, or the time duration between the end of the former ABS control, i.e. t4 and the start of the next ABS control, i.e. t8, is shorter than a predetermined threshold value, the Pm mode is triggered, so that the control valve 22FL is not deenergized at time point t10 but is maintained in the energized condition for a predetermined time duration.

Figure 13:
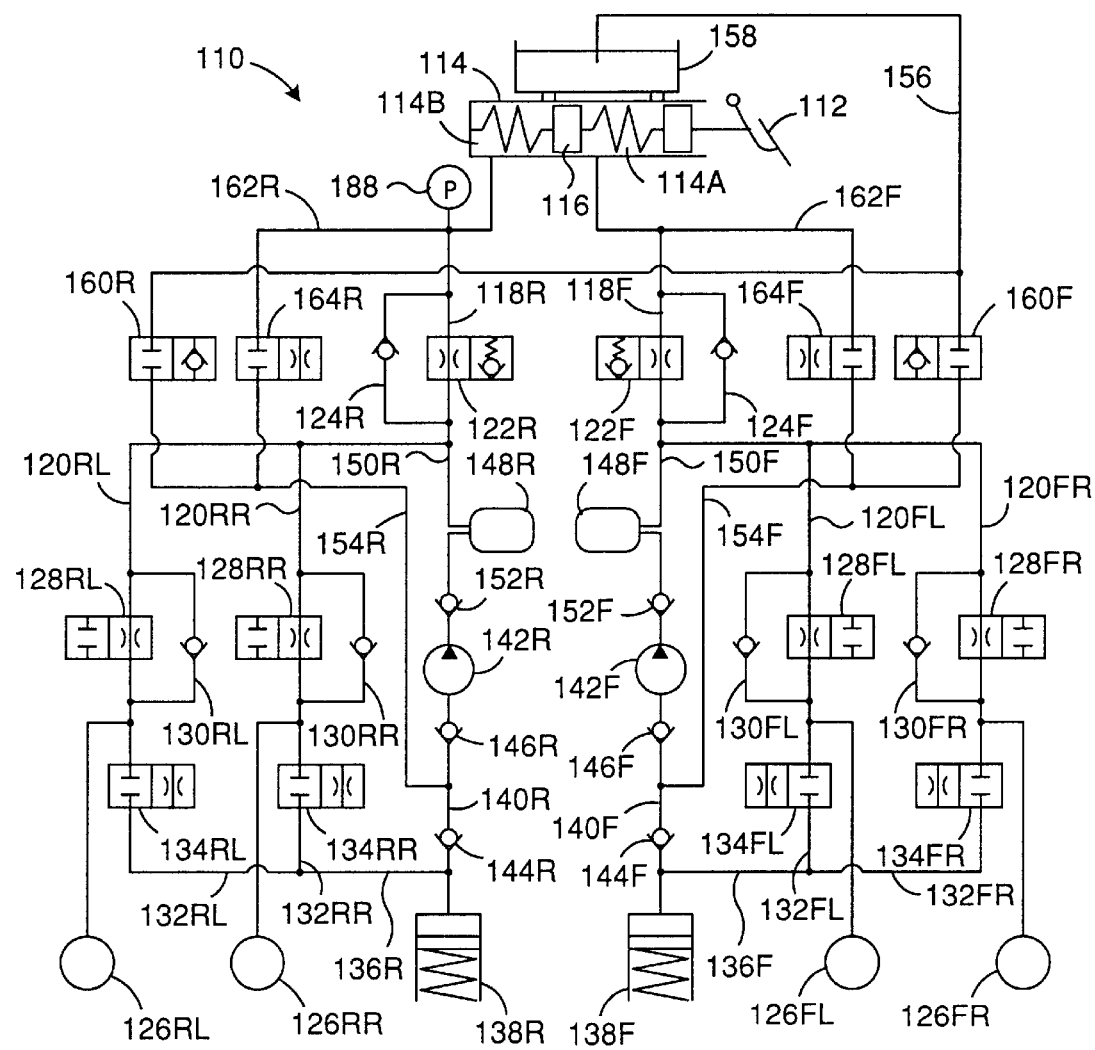
FIG. 13 is a diagrammatical illustration of a second example of a brake hydraulic circuit of a vehicle with which several embodiments of the present invention are constructed.

FIG. 13 is a diagrammatic illustration of a second example of a brake hydraulic circuit of a vehicle, similar to FIG. 1A, with which further several embodiments of the brake system according to the present invention may be constructed.

Referring to FIG. 13, the hydraulic generally designated by 110 includes a brake pedal 112 and a master cylinder 114 having a front cylinder chamber 114A and a rear cylinder chamber 114B separated by a free piston 116. A passage 118F extends from the front cylinder chamber 114A through a normally open control valve 122F to be branched to a passage 120FL leading to a wheel cylinder 126FL of a front left wheel not shown in the figure and a passage 120FR leading to a wheel cylinder 126FR of a front right wheel not shown in the figure. The passage 120FL includes a normally open control valve 128FL, while the passage 120FR similarly includes a normally open control valve 128FR. The control valves 128FL and 128FR are respectively bypassed by passages 130FL and 130FR, respectively, each incorporating a non-return valve for allowing the fluid to flow only from the downstream side to the upstream side of the control valve 120FL or 120FR. The wheel cylinder 126FL is connected with a return passage 136FL by a passage 132FL incorporating a normally closed control valve 134FL, while the wheel cylinder 126FR is connected with the return passage 136F via a passage 132FR incorporating a normally closed control valve 134FR. The return passage 136F is connected with an inlet side of a pump 142F via a non-return valve 144F, a intermediate passage 140F and a non-return valve 146F, those non-return valves being oriented to allow the fluid to flow only toward the inlet side of the pump. A buffer reservoir 138F is connected to the passage 136F. The outlet side of the pump 142F is connected via a passage 150F to the passages 120FL and 124FR at an upstream portion thereof. The passage 150F incorporates a non-return valve 152F for allowing the fluid to flow only in the direction of delivery of the fluid from the pump 142F and a damper 148F. The outlet side of the pump 142F is also connected with the passage 118F at the downstream side of the control valve 122F as viewed from the master cylinder. The control valve 122F is bypassed by a bypass passage 124F including a non-return valve which allows the fluid to flow only from the upstream side to the downstream side thereof as viewed from the master cylinder. A mid-point of the intermediate passage 140F is connected with the front cylinder chamber 114A via a series connection of passages 154F and 162F, the latter including a normally closed control valve 164F. The mid-point of the intermediate passage 140F is also connected with a reservoir 158 provided adjacent to the master cylinder by a series connection of the passage 154F and a passage 156, the latter including a normally closed control valve 160F.

126RL and 126RR are wheel cylinders of a front left wheel and a front right wheel, respectively, not shown, and between these wheel cylinders of the rear wheels and the rear cylinder chamber 114B of the master cylinder there are provided hydraulic circuit similar to the hydraulic circuits provided between the wheel cylinders 126FL and 126FR and the front cylinder chamber 114A. Therefore, in order to avoid a redundancy of the description, the portions in the hydraulic circuits for the rear wheels corresponding to those in the hydraulic circuits for the front wheels are designated by such notations bearings numerals corresponding to those of the hydraulic circuits for the front wheels with modification of alphabets in capital denoting front or rear and left or right, and repetitive descriptions about the hydraulic circuits of the rear wheels will be omitted. However, it will be noted that a pressure sensor 188 is provided to measure the fluid pressure in the passage 162R, although such a pressure sensor may be connected to the passage 162F, since the pressures of the cylinder chambers 114A and 114B separated by the free piston 116 are substantially the same as one another.

Figure 14A:
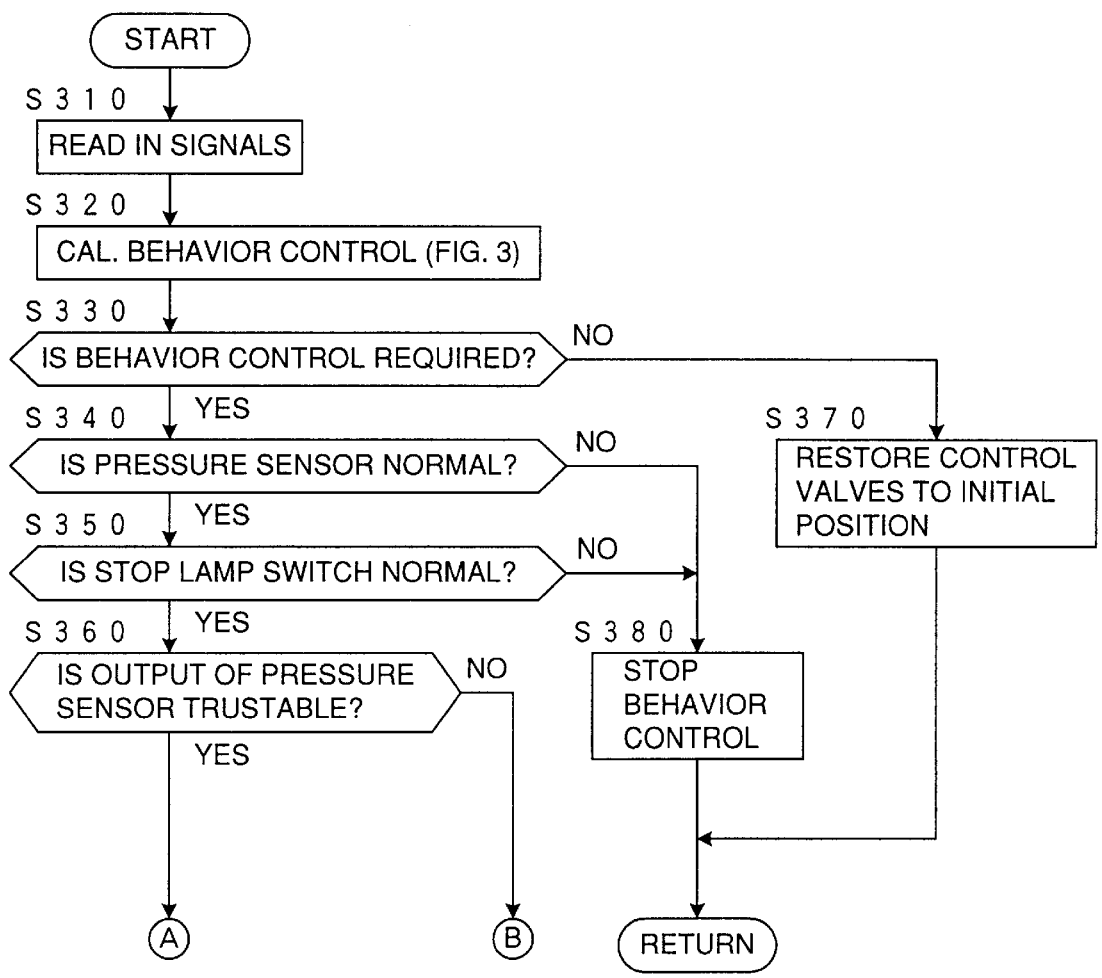
Figure 14C:
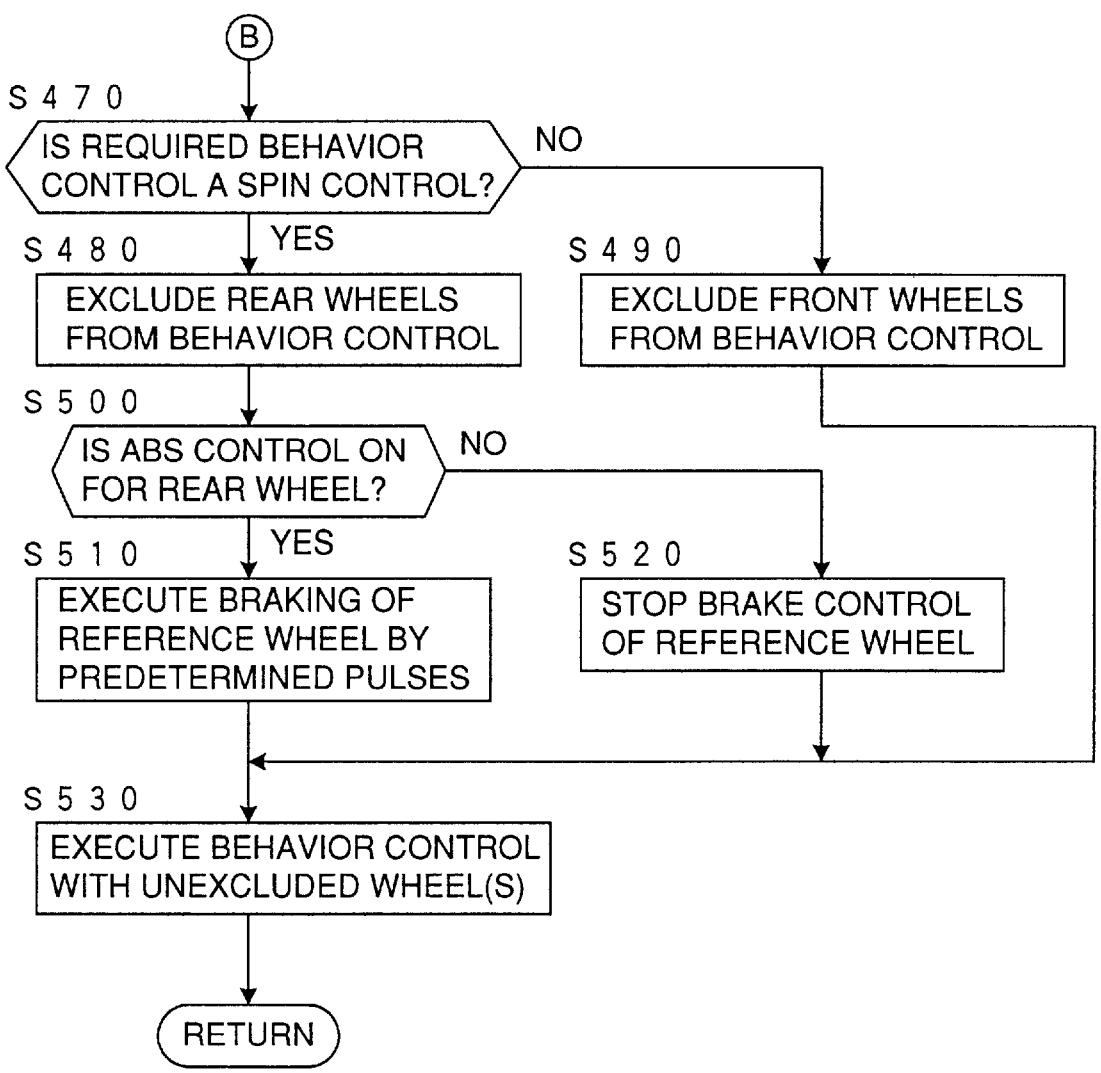

A third embodiment of the brake system according to the present invention which can be constructed with the hydraulic circuit system 110 shown in FIG. 13 and the automatic controller 70 shown in FIG. 1B will be described with reference to FIGS. 14A, 14B and 14C showing a flowchart in combination, expressing the third embodiment in the form of the operation thereof.

Referring to FIG. 14A, when the brake system was started by a closure of an ignition switch not shown, in the same manner as described with reference to the preceding embodiments, in step 310, signals are read in from those sensors and switch shown in FIG. 1B.

In step 320, a behavior control calculation is carried out in the same manner as described with reference to FIG. 3. In this case, the slip ratios Rsi (i=fo, fi, ro, ri) of the four wheels may be calculated in a more versatile manner by referring to the maps shown in FIGS. 16 and 17 according to the spin quantity SQ and the driftout quantity DQ as follows:

Rsfo=Rsfos+Rsfod
Rsfi=0
Rsro=Rsros+Rsrod
Rsri=Rsrid

Figure 16:
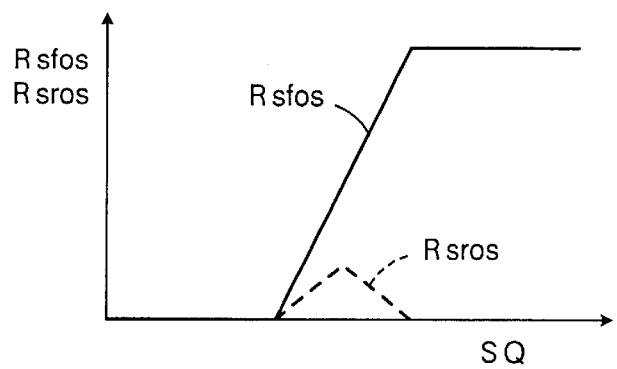
FIG. 16 is a graph similar to that of FIG. 6, showing another example of the map for calculating slip ratios for a spin control according to the spin quantity.

In FIG. 16, Rsfos indicates a target slip ratio for the front wheel serving at the outside of the turn, while Rsros is a target slip ratio for the rear wheel serving at the outside of the turn, both determined according to the magnitude of the slip quantity SQ. This means that both the front and rear wheels serving at the outside of the turn may be braked for a spin control.

Figure 17:
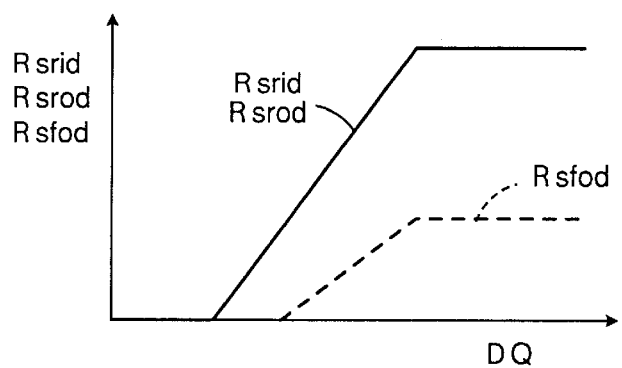
FIG. 17 is a graph similar to that of FIG. 7, showing another example of the map for calculating slip ratios for a driftout control according to the driftout quantity.

In FIG. 17, Rsrid and Rsrod indicate target slip ratios for the rear wheel serving at the inside of the turn and the rear wheel serving at the outside of the turn, while Rsfod indicates a target slip ratio for the front wheel serving at the outside of the turn, all being determined for a driftout control according to the magnitude of the driftout quantity DS. This means that in the driftout control the front wheel serving at the outside of the turn and the rear left and rear right wheels are braked. The performances of the target slip ratios vs. the spin quantity or the driftout quantity for the respective wheels in a spin control or a driftout control are as shown in FIGS. 16 or 17.

In step 330, it is judged if any behavior control is required. When the answer is yes, the control proceeds to step 340, and it is judged if the pressure sensor 188 in FIG. 13 is normal or not. The normality of the pressure sensor may be judged in any appropriate manner such as, for example, checking that the pressure sensor changes its output according to on and off of the stop lamp switch 90, its output value is not always zero or not abnormally high beyond a predetermined threshold value, etc. When the answer is yes, the control proceeds to step 350, and it is judged if the stop lamp switch 90 is normal. The normality of the stop lamp switch 90 may be checked by any appropriate manner such as, for example, checking if the lamp gets on or off according to changes of the output of the pressure sensor 188. With regard to the steps 340 and 350, if the output of the pressure sensor is checked according to on or off of the stop lamp switch, it is possible to detect a loss of normality of the pressure sensor at a higher probability than a loss of normality of the stop lamp switch, while when the output of the stop lamp switch is checked according to a variation of the output of the pressure sensor across an appropriate threshold value, it is possible to detect a loss of normality of the stop lamp switch at a higher probability than a loss of normality of the pressure sensor. When the answer of step 350 is yes, the control proceeds to step 360.

In step 360, it is judged if the output of the pressure sensor 188 is trustable or not. The trustability of the output of the pressure sensor may be judged by measuring a change rate of its output after a switching on or off of the stop lamp switch or by providing an auxiliary stop lamp switch having a switching point shifted from the principal stop lamp switch. If the answer is yes, the control proceeds to step 390.

When the answer of step 330 is no, the control proceeds to step 370, where the control valves are restored to the initial positions as shown in FIG. 13. When the answer of step 340 or 350 is no, the control proceeds to step 380, and the behavior control is stopped when it was already started, or is not executed, when it is not yet started.

Referring to FIG. 14B, in step 390, it is judged if the output of the stop lamp switch 90 is trustable. The trustability of the output of the stop lamp switch may be judged if it never fails to operate in response to the changes of the output of the pressure sensor across a predetermined threshold value. When the answer is yes, the control proceeds to step 400.

In step 400, it is judged if the stop lamp switch is on and at the same time the master cylinder pressure Pm detected by the pressure sensor 188 is higher than a predetermined first threshold value Pma. When the answer is yes, i.e., when it was highly assured that the driver is substantially depressing the brake pedal, the control proceeds to step 420.

On the other hand, when the answer of step 390 is no, the control proceeds to step 410, and it is checked if the master cylinder pressure Pm is higher than a second threshold value Pmb predetermined to be higher than the first threshold value Pma. If the answer is yes, although there might be some uncertainty in the output signal of the stop lamp switch 90, since it was confirmed that the master cylinder pressure was certainly increased by a depression of the brake pedal, the control proceeds to step 400.

Figure 15:
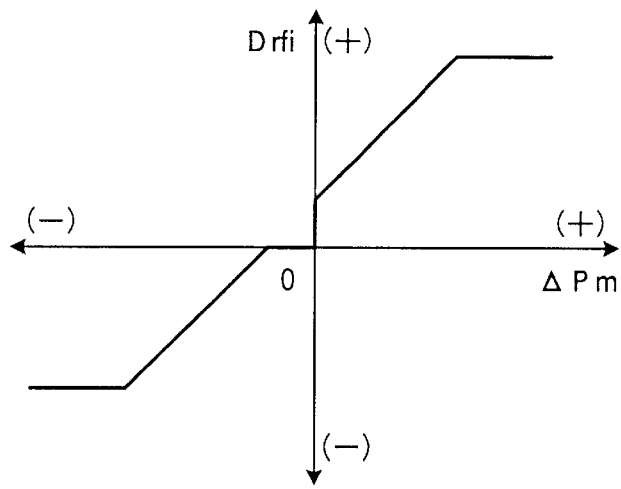
FIG. 15 is a graph similar to that of FIG. 5, showing another example of a map for calculating the aforementioned duty ratio according to a change rate of the master cylinder pressure.

In step 420, the change rate ΔPm of the master cylinder pressure is calculated in the same manner as the first and second embodiments, and then in step 430 the duty ratio for the reference wheel, i.e. the front wheel serving at the inside of the turn, is calculated based upon the change rate ΔPm of the master cylinder pressure by referring to a map such as shown in FIG. 15, which is similar to the map of FIG. 5 but is different therefrom in that the duty ration Drfi for the front wheel serving at the inside of the turn has a certain positive value when the change rate ΔPm is zero. Such a performance of the duty ration Drfi as shown in FIG. 15 provides and advantages that, even when the brake system is operated with a certain loss of normality of the pressure sensor not yet being detected, or the output of the pressure sensor becomes somewhat unstable, a slight braking is applied to the reference wheel during a turn behavior control.

In step 440, the braking of the reference wheel, i.e. the front wheel serving at the inside of the turn, is executed according to the duty ratio calculated in the preceding step, in the same manner as described with reference to FIG. 4.

When the answer of step 400 is no, the control proceeds to step 460, and the brake control of the reference wheel is stopped or is not started.

When the answer to step 360 is no, the control proceeds to step 470 of FIG. 14C, and it is judged if the behavior control judged to be required in step 330 is a spin control. When the answer is yes, the control proceeds to step 480, whereas if the answer is no, the control proceeds to step 490.

In step 480, the rear wheels are excluded from the behavior control, and therefore the wheel cylinders 126RL and 126RR are constantly communicated with the rear chamber space 114B to be placed under the control of the brake pedal operated by the driver, considering that the rear wheels are generally excludible from the behavior control in the case of a spin control, and therefore to be excluded from any control depending upon the output of the pressure sensor doubtful of its trustability.

In step 500, it is checked in an ABS control is judged to be executed for one or two of the rear wheels. When the answer is yes, it is guessed that the driver is strongly depressing the brake pedal. Therefore, in step 510, a braking of the reference wheel is executed by energizing the control valve 128FL or 128FR of the reference wheel by predetermined pulses, so that the reference wheel is braked to reflect thereon the driver's will for braking the vehicle.

However, when the answer of step 500 is no, in step 520 the brake control of the reference wheel is stopped or not executed.

In either case, or when the control proceeded to step 490 by the negative answer of step 470, thereby indicating that the behavior control judged to be required in step 330 is a driftout control, in step 530 a corresponding spin or driftout control is executed with the wheels not excluded, according to the same manner as described in the preceding embodiments.

Figure 18:
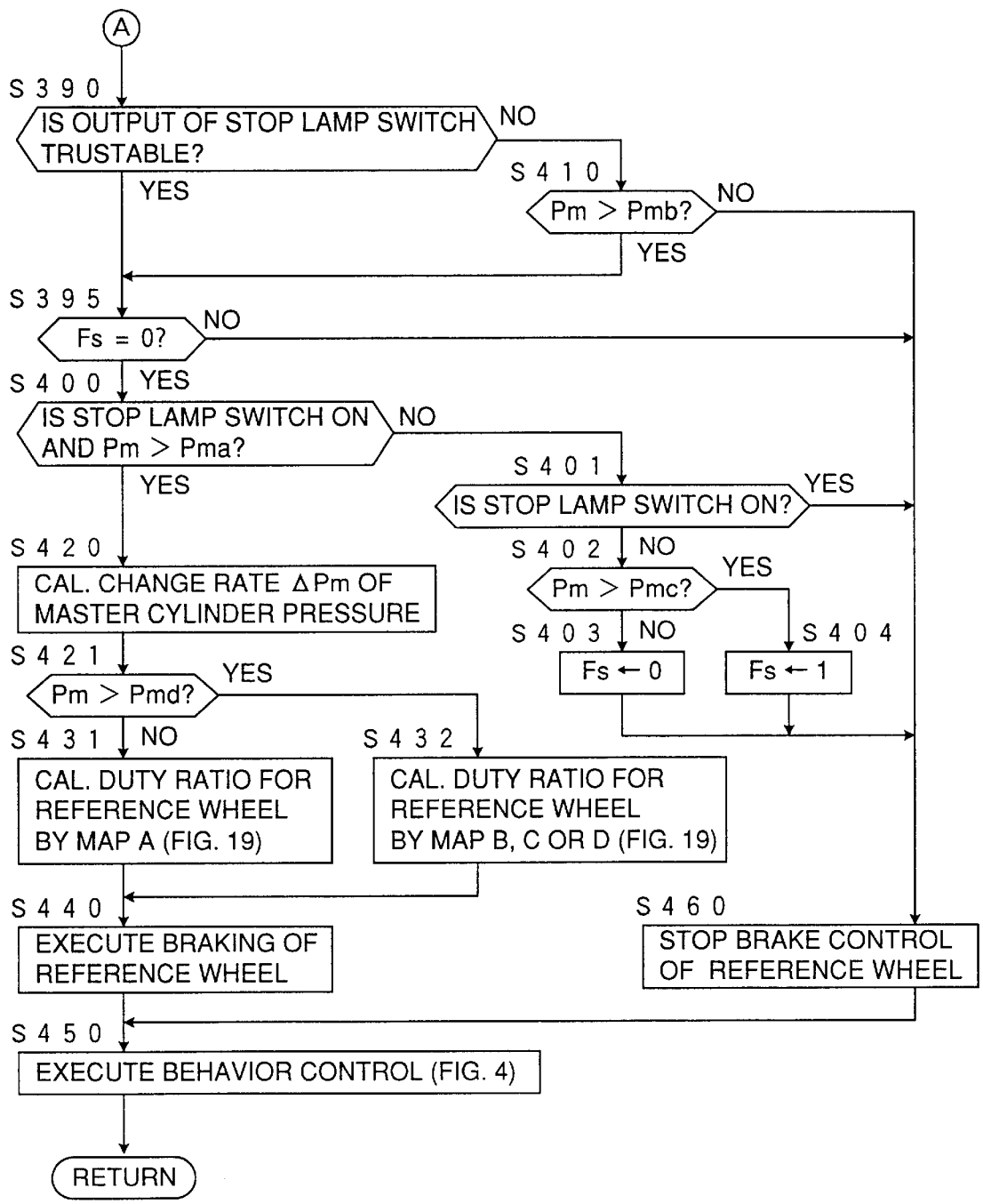
FIG. 18 is a flowchart showing a fourth embodiment of the present invention in the form of the operation thereof.
Figure 19:
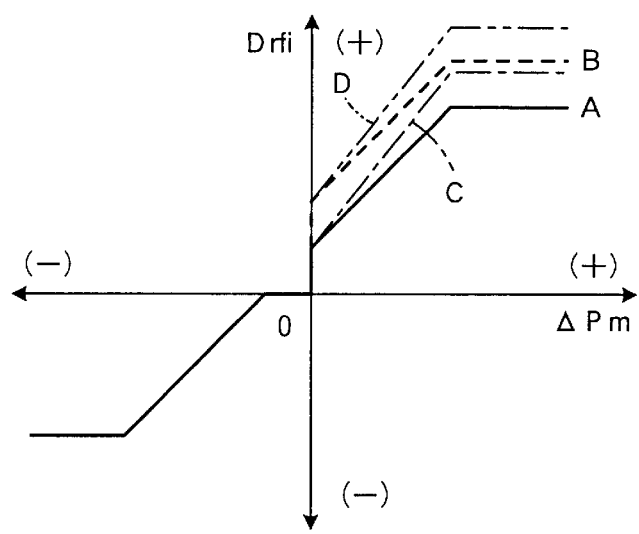
FIG. 19 is a graph similar to those of FIGS. 5 and 15, showing still another example of the map for calculating the duty ratio according to a change rate of the master cylinder pressure.
Figure 22:
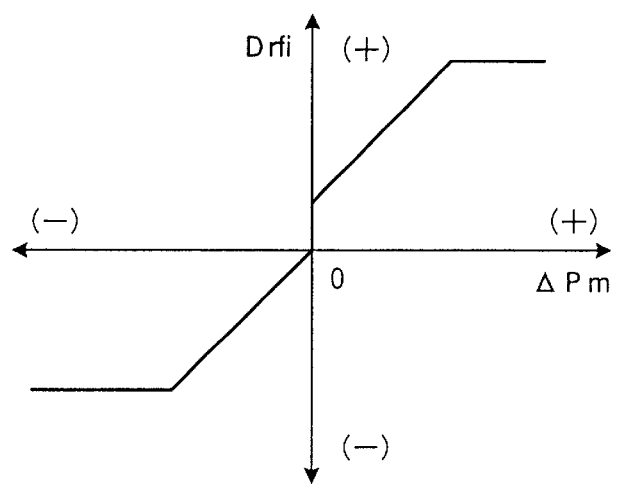
FIG. 22 is a graph similar to those of FIGS. 5, 15 and 19, showing still another example of the map for calculating the duty ratio according to a change rate of the master cylinder pressure.
Figure 23:
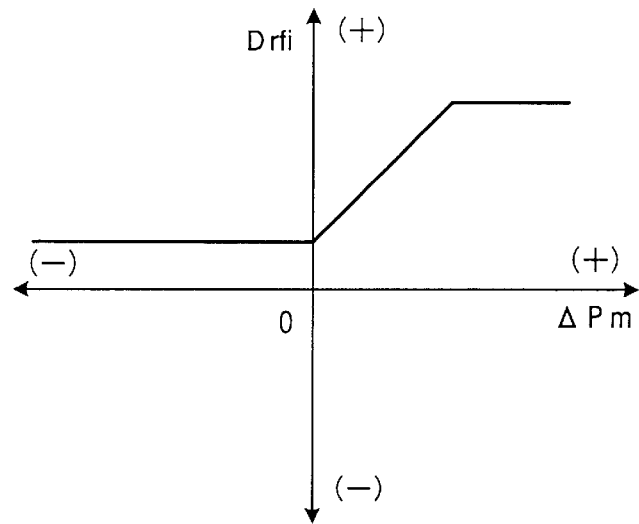
FIG. 23 is a graph similar to those FIGS. 5, 15, 19 and 22, showing still another example of the map for calculating the duty ratio according to a change rate of the master cylinder pressure.

FIG. 18 is a flowchart presenting an alternative embodiment replaceable with the flowchart of FIG. 14B to be combined with FIG. 14A at the terminals A, so as to provide a fourth embodiment of the brake system according to the present invention. In FIG. 18, the steps which are substantially the same as those in FIG. 14B are designated by the same step numbers as in FIG. 14B. In this fourth embodiment, when the answer of step 390, or the answer of step 410 described hereinbelow, is yes, it is judged in step 395 if a flag Fs is zero or not, before proceeding to step 400. The flag Fs, which is initialized to zero every time when the brake system is started, is controlled between 0 or 1 according to steps 401 to 404. In more detail, since the flag Fs is first initialized to zero, after the start up of the brake system, the control will proceed for the time being through step 395 for yes. In an early stage of the operation after the start, the condition will be met that the answer of step 400 is no, so that the control proceeds to step 401. Then in step 401, it is judged if the stop lamp switch is on. The condition that the stop lamp switch is not on will be readily met in an early stage of the operation of the brake system. Therefore, the control will soon proceed to step 402. In step 402, it is judged if the master cylinder pressure Pm is higher than a predetermined relatively small threshold value Pmc. If the stop lamp switch and the pressure sensor are both normal, the answer of step 402 is no, and therefore the control proceeds to step 403, and the zero condition of flag Fs is confirmed. On the other hand, if the answer of step 402 is yes, it is guessed that either the stop lamp switch or the pressure sensor is not normal. In this case, the control proceeds to step 404, and the flag Fs is set to 1. When the answer of step 401 is yes, it is also guessed that there is a trouble in either the stop lamp switch or the pressure sensor, more probably a trouble in the pressure sensor. Therefore, when the answer of step 401 is yes, the control proceeds to step 460, and the brake control of the reference wheel is stopped or not executed. When the answer of step 400 is no so that the control proceeds to step 401, there is no need of the brake control of the reference wheel, and therefore the control from step 403 or 404 proceeds to step 460.

Further, in the embodiment of FIG. 18, after the change rate ΔPm of the master cylinder pressure was calculated in step 420, the control proceeds to step 421, where it is judged if the master cylinder pressure Pm is higher than a predetermined threshold value Pmd. Then, according to no or yes of the answer, the control proceeds to step 431 or 432. When the control proceeds to step 431, the duty ratio Drfi for the reference wheel, i.e. the front wheel serving at the inside of the turn, is calculated according to map A of FIG. 19, while when the control proceeds to step 432, the duty ratio Drfi for the reference wheel is calculated by map B, C or D of FIG. 19, so as to be more increased against the value of ΔPm than in step 431, so that the braking control of the reference wheel is controlled for a higher performance in accordance with the change rate ΔPm of the master cylinder pressure with as influential action of the magnitude of the master cylinder pressure Pm thereon. The performance of Drfi vs. ΔPm may be further modified as exemplarily shown in FIG. 22 or 23, the features of which will be self-explanatory from the indication of the maps.

Except those modifications as described above, the operation of the fourth embodiment shown in FIG. 18 is substantially the same as that of the third embodiment shown in FIGS. 14A, 14B and 14C. Therefore, further detailed descriptions of this fourth embodiment will be omitted to avoid a redundancy of the description.

Figure 20:
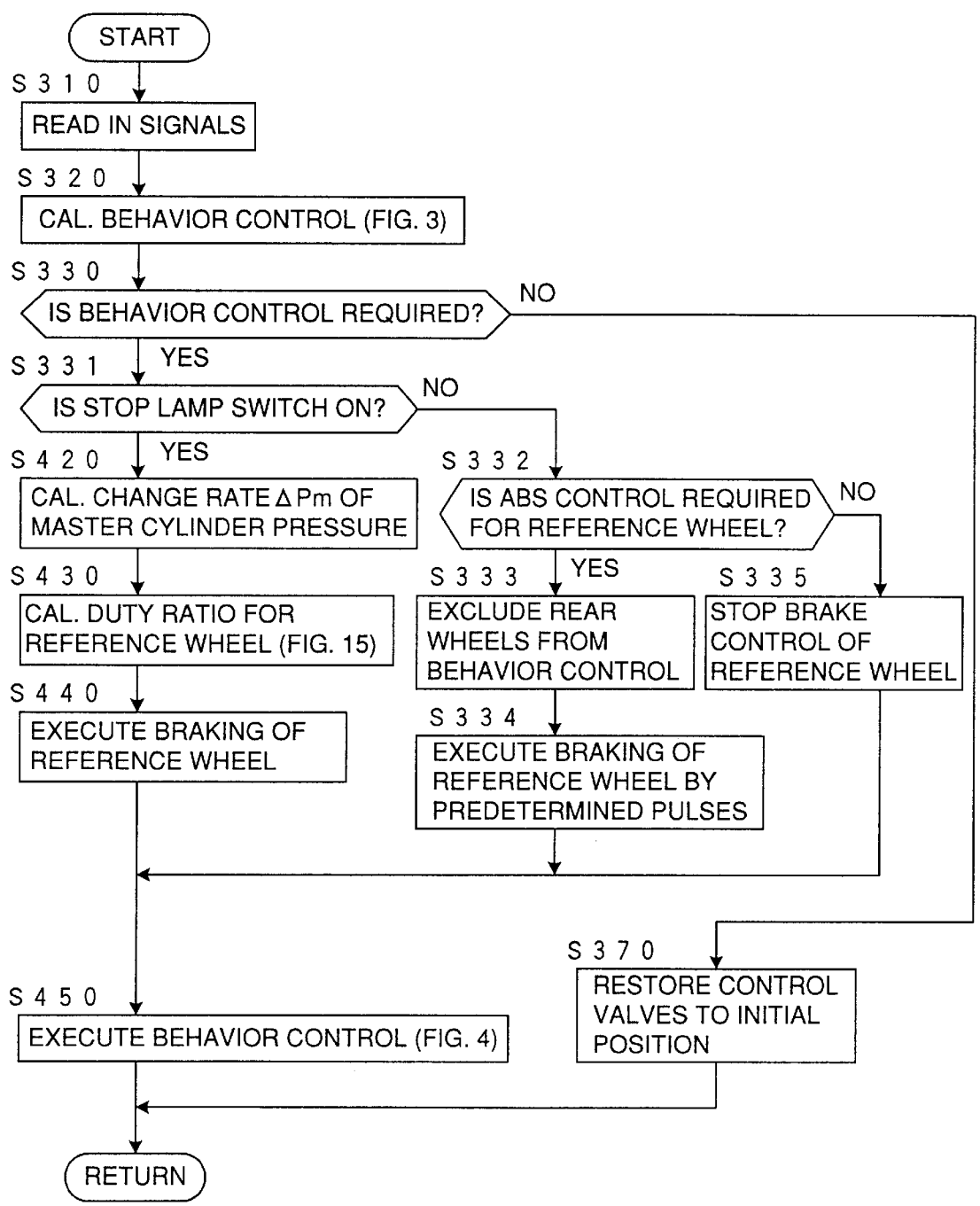
FIG. 20 is a flowchart showing a fifth embodiment of the present invention in the form of the operation thereof.

FIG. 20 shows a fifth embodiment of the brake system according to the present invention in the form a a flowchart of its operation. In the flowchart of FIG. 20, the steps corresponding to those of the flowcharts of FIGS. 14A, 14B and 14C and FIG. 18 are designated by the same step numbers and the controls in those steps are executed substantially in the same manner as in the preceding embodiments. Therefore, any repetitive description about those steps will be omitted to avoid a redundnacy of the descriptions. Further, it will be noted that this fifth embodiment may be constructed with the hydraulic circuit system of FIG. 13 and the automatic controller of FIG. 1B.

In the flowchart of FIG. 20, when it is judged in step 330 that a behavior control is required, then in step 331 it is judged if the stop lamp switch 90 is on. If the answer is yes, the control proceeds to step 420 and the braking of the reference wheel and the behavior control are executed in the same manner as in the third embodiment of FIGS. 14A, 14B and 14C.

When the answer of step 331 is no, the control proceeds to step 332, and it is judged if an ABS control is required for the reference wheel, i.e. the front wheel serving at the inside of the turn. If the answer is yes, it is highly probable that the stop lamp switch has failed. Therefore, the control proceeds to step 333, where the rear wheels are excluded from the behavior control, so that the wheel cylinders 126RL and 126RR are maintained in communication with the rear cylinder chamber 114B, and then the control proceeds to step 334, where the braking of the reference wheel is executed by energizing the control valve 128FL or 128FR of the reference wheel with predetermined pulses. Then the control proceeds to step 450.

When the answer of step 332 is no or turned into no, the control proceeds to step 335, and the brake control of the reference wheel is stopped or not executed from the beginning. Then the control proceeds to step 450.

When the answer of step 330 is no, the control proceeds to step 370, where the control valves are restored to the initial position, and the control returns to step 310.

Figure 21:
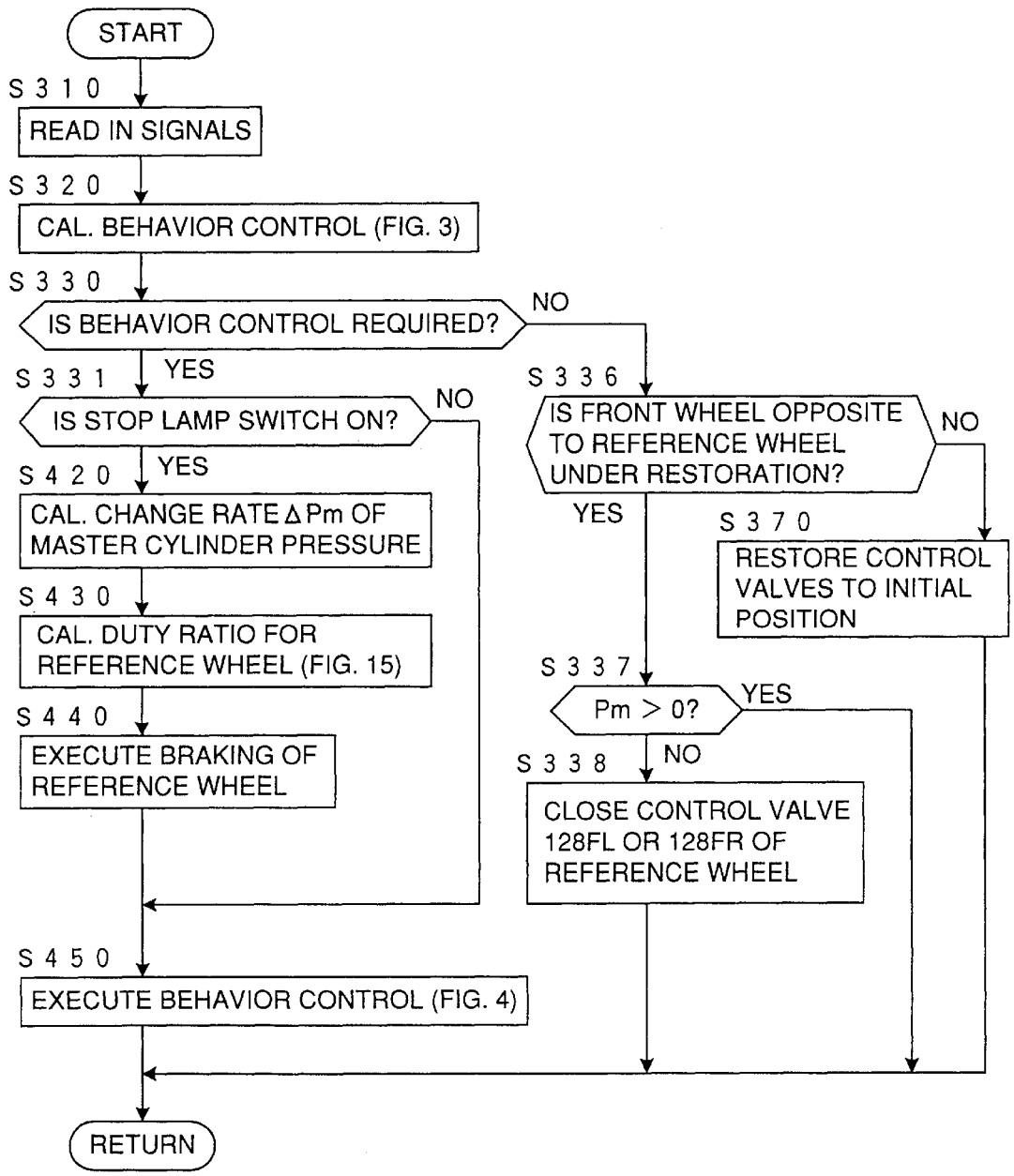
FIG. 21 is a flowchart showing a sixth embodiment of the present invention in the form of the operation thereof.

FIG. 21 shows a sixth embodiment of the brake system according to the present invention in the form of a flowchart of its operation. In FIG. 21, the steps corresponding to those of the flowchart of FIGS. 14A, 14B and 14C or the flowchart of FIG. 20 are designated by the same step numbers, and since the control operations executed in those steps are the same as those in the preceding embodiments, further detailed descriptions of those steps will be omitted to avoid a redundnacy of the specification.

In this sixth embodiment, when the answer of step 330 is no, the control proceeds to step 336, and it is judged if the front wheel opposite to the reference wheel is under the restoration. Assuming that, for example, the front right wheel was braked for a spin control, when the spin control ended, it can happen that a substantial fluid pressure still remains in the wheel cylinder 126FR. This pressure is returned through the inlet passage 120FR toward the master cylinder and also through the return passage 132FR toward the reservoir 158. During such a restoration process, if the vehicle is not being braked, it can happen that the pressure of the wheel cylinder 126FR during the restoration process is partly supplied to the wheel cylinder 126FR through its inlet passage 12GFR, thereby disturbing the behavior of the vehicle. In view of this, when the answer of step 336 is yes, the control proceeds to step 337, and it is checked if the master cylinder pressure Pm is larger than zero. Then, if the answer is no, the control proceeds to step 338, and the control valve 128FL or 128FR of the reference wheel is closed until the restoration process is completed. The completion of the restoration process may be detected by an appropriate limit switch mounted to the wheel cylinder or may be detected by an appropriate limit switch mounted to the wheel cylinder or may be judged by the lapse of an appropriate time from the end of the behavior control. In step 337, the master cylinder pressure Pm may be compared with an appropriate small value larger than zero, so that the control of step 338 is executed only when the brake pedal is not depressed beyond a certain small depth, so that a substantial influence of the above-mentioned restoration pressure on the stability of the vehicle behavior only is avoided.

Although the present invention has been described in detail with respect to several preferred embodiments thereof, it will be apparent for those skilled in the art that various modifications are possible with respect to the shown embodiments within the scope of the present invention.

What is claimed is:

1. A brake system of a vehicle having front left, front right, rear left and rear right wheels, the brake system comprising wheel cylinders each corresponding to each of the above-mentioned wheels, a brake pedal adapted to be depressed by a driver, a master cylinder operatively connected with the brake pedal to be compressed according to a depression thereof by the driver, powered fluid pressure source means for generating a powered fluid pressure, fluid flow control circuit means including control valves, and an automatic controller for selectively operating the powered fluid pressure source means and the control valves so as to supply a selected one or more of the wheel cylinders with a fluid pressure controlled from the powered fluid pressure of an execution of the turning behavior control of the vehicle according to running conditions of the vehicle, while isolating the one or more of the wheel cylinders selected for the behavior control from the master cylinder wherein the automatic controller also executes a deceleration brake control of supplying at least one of the wheel cylinders not selected for the behavior control with a fluid pressure controlled from the powered fluid according to a braking calculation based upon a depression of the brake pedal by the driver during the execution of the behavior control, the at least one wheel cylinder being isolated in the meantime from the master cylinder.

2. A brake system according to claim 1, wherein the automatic controller supplied the controlled fluid pressure for the execution of the behavior control to the wheel cylinder of one of the rear wheels serving at the inside of a turn of the vehicle when the behavior control is to suppress a driftout of the vehicle, while it also supplies the controlled fluid pressure according to the depression of the brake pedal by the driver to one of the rear wheels serving at the outside of the turn.

3. A brake system according to claim 1, wherein the automatic controller supplies the controlled fluid pressure for the execution of the behavior control to the wheel cylinder of one of the front wheels serving at the outside of a turn of the vehicle when the behavior control is to suppress a spin of the vehicle, while it also supplies the controlled fluid pressure according to the depression of the brake pedal by the driver to one of the front wheels serving at the inside of the turn.

4. A brake system according to claim 1, wherein the automatic controller generally switches one of the control valves from a first switch position to a second switch position while the brake pedal is being depressed beyond a predetermined depth so as to be prepared for supplying the controlled fluid pressure based upon the powered fluid pressure source means to the at least one wheel cylinder according to the depression of the brake pedal by the driver such that at the second switch position the at least one wheel cylinder is isolated from the master cylinder, the automatic controller further controlling the one control valve so as to be held at the second switch position for at least a predetermined time duration regardless of a release of the depression of the brake pedal when it executed a second time of switching the one control valve from the first switch position to the second switch position subsequent to a first time of switching the one control valve from the first switch position to the second switch position before a predetermined time lapses after the end thereof.

5. A brake system according to claim 1, wherein the automatic controller further executes an ABS control of decreasing the fluid pressure supplied to the at least one wheel cylinder according to the depression of the brake pedal by the driver when the supply of the fluid pressure thereto causes an excessive slipping of one of the wheels corresponding thereto.

6. A brake system according to claim 5, wherein the automatic controller generally switches one of the control valves from a first switch position to a second switch position while the brake pedals being depressed beyond a predetermined depth so as to be prepared for supplying the controlled fluid pressure based upon the powered fluid pressure source means to the at least one wheel cylinder according to the depression of the brake pedal by the driver such that at the second switch position the at least one wheel cylinder is isolated from the master cylinder, the automatic controller further controlling the one control valve so as to be held at the second switch position for at least a predetermined time duration regardless of a release of the depression of the brake pedal when it executed a second time of the ABS control subsequent to a first time of the ABS control before a predetermined time duration lapses after the end thereof.

7. A brake system according to claim 1, wherein the brake system further comprises a pressure sensor for detecting a fluid pressure of the master cylinder, while the automatic controller confirms if an output of the pressure sensor is trustable before executing the brake control according to the depression of the brake pedal by the driver.

8. A brake system according to claim 7, wherein the brake system further comprises a stop lamp switch for detecting a depression of the brake pedal by the driver beyond a predetermined depth, while the automatic controller confirms if an output of the stop lamp switch is trustable before executing the brake control according to the depression of the brake pedal by the driver.

9. A brake system according to claim 8, wherein the brake system further confirms that the stop lamp switch is indicating the depression of the brake pedal larger than the predetermined depth, with a simultaneous indication by the pressure sensor of the master cylinder pressure high than a first predetermined value, before executing the brake control according to the depression of the brake pedal by the driver.

10. A brake system according to claim 8, wherein the automatic controller further confirms that the pressure sensor indicates a pressure of the master cylinder higher than a second predetermined value when the stop lamp switch is not indicating the depression of the brake pedal larger than the predetermined depth, before executing the brake control according to the depression of the brake pedal by the driver.

11. A brake system according to claim 9, wherein the brake system further confirms, when a first condition that the stop lamp switch is detecting the brake pedal being depressed beyond the predetermined depth and a second condition that the pressure sensor is detecting a fluid pressure of the master cylinder larger than the predetermined value are not met at the same time, that the stop lamp switch does not detect the brake pedal being depressed beyond the predetermined depth, while the pressure sensor does not detect the master cylinder pressure higher than a third predetermined value, before executing the brake control according to the depression of the brake pedal by the driver.

12. A brake system according to claim 1, wherein the brake system further comprises a pressure sensor for detecting a fluid pressure of the master cylinder, while the automatic controller confirms if an output of the pressure sensor is trustable, and if the output of the pressure sensor is not trustable, the automatic controller excludes the wheel cylinders of the rear left and rear right wheels so that they are in communication with the master cylinder when it judges that a spin control is required, while it excludes the wheel cylinders of the front left and front right wheels so that they are in communication with the master cylinder when it judges that a driftout control is required.

13. A brake system according to claim 12, wherein, when the automatic controller judges that a spin control is required, while it also judges a need of an ABS control for one of the front wheels serving at the inside of a turn of the vehicle, the automatic controller executes a braking of the one front wheel a supply of a fluid pressure controlled according to a predetermined schedule of pulses.

14. A brake system according to claim 1, wherein the automatic controller supplies a fluid to the at least one wheel cylinder as a series of pulse flows thereof at a duty ration which increases from zero according to increase of the change rate of a fluid pressure of the master cylinder beyond a predetermined first substantial threshold value when the fluid pressure of the master cylinder increases, while it exhausts the fluid from the at least one wheel cylinder as a series of pulse flows thereof at a duty ratio which increases from zero according to increase of the change rate of the fluid pressure of the master cylinder beyond a predetermined second substantial threshold value when the fluid pressure of the master cylinder decreases.

15. A brake system according to claim 1, wherein the automatic controller supplies a fluid to the at least one wheel cylinder as a series of pulse flows thereof at a duty ratio which increases from a substantial initial value according to increase of the change rate of a fluid pressure of the master cylinder beyond zero when the fluid pressure of the master cylinder increases, while it exhausts the fluid from the at least one wheel cylinder as a series of pulse flows thereof at a duty ratio which increases from zero according to increase of the change rate of the fluid pressure of the master cylinder beyond a predetermined second substantial threshold value when the fluid pressure of the master cylinder decreases.

16. A brake system according to claim 15, wherein the initial value is increased according to increase of the fluid pressure of the master cylinder.

17. A brake system according to claim 15, where in the duty ratio increases at a higher rate according to increase of the change rate of the fluid pressure of the master cylinder as the fluid pressure of the master cylinder increases.

18. A brake system according to claim 16, wherein the duty ratio increases at a higher rate according to increase of the change rage of the fluid pressure of the master cylinder as the fluid pressure of the master cylinder increases.

19. A brake system according to claim 1, wherein the automatic controller supplies a fluid to the at least one wheel cylinder as a series of pulse flows thereof at a duty ratio which increases from a substantial initial value according to increase of the change rate of a fluid pressure of the master cylinder beyond zero when the fluid pressure of the master cylinder increases, while it supplies the fluid to the at least one wheel cylinder as a series of pulse flows thereof at a duty ratio which is substantially constant when the fluid pressure of the master cylinder decreases.

20. A brake system according to claim 1, wherein the brake system further comprises a stop lamp switch for detecting a depression of the brake pedal by the driver beyond a predetermined depth before executing the brake control according to the depression of the brake pedal by the driver, while the automatic controller confirms, when the stop lamp switch is not detecting the brake pedal being depressed beyond the predetermined depth, that it is judging a need of an ABS control with respect to one of the front wheels serving at the inside of a turn before executing the brake control according to the depression of the brake pedal by the driver.

21. A brake system according to claim 1, wherein, when the wheel cylinder of one of the front left and front right wheels supplied with the fluid pressure for the behavior control is being exhausted of the fluid pressure for a restoration thereof, while the brake pedal is not substantially depressed, the automatic controller controls at least one of the control valves such that the exhausting pressure is not substantially supplied to the wheel cylinder of the other of the front left and front right wheels.

* * * * *